United States Patent
Albooyeh et al.

(10) Patent No.: US 12,541,706 B2
(45) Date of Patent: Feb. 3, 2026

(54) SYSTEM AND METHOD FOR OUT-OF-SAMPLE REPRESENTATION LEARNING

(71) Applicant: ROYAL BANK OF CANADA, Toronto (CA)

(72) Inventors: Marjan Albooyeh, Montreal (CA); Seyed Mehran Kazemi, Montreal (CA)

(73) Assignee: ROYAL BANK OF CANADA, Toronto (CA)

( * ) Notice: Subject to any disclaimer, the term of this patent is extended or adjusted under 35 U.S.C. 154(b) by 1332 days.

(21) Appl. No.: 17/150,343

(22) Filed: Jan. 15, 2021

(65) Prior Publication Data
US 2021/0224690 A1 Jul. 22, 2021

Related U.S. Application Data

(60) Provisional application No. 62/963,591, filed on Jan. 21, 2020.

(51) Int. Cl.
*G06N 20/00* (2019.01)
*G06F 7/58* (2006.01)
(Continued)

(52) U.S. Cl.
CPC .......... *G06N 20/00* (2019.01); *G06F 16/9024* (2019.01); *G06F 7/58* (2013.01); *G06N 3/045* (2023.01); *G06N 5/022* (2013.01)

(58) Field of Classification Search
CPC ........ G06N 20/00; G06N 3/045; G06N 5/022; G06F 16/9024; G06F 7/58
See application file for complete search history.

(56) References Cited

U.S. PATENT DOCUMENTS

| | | | |
|---|---|---|---|
| 11,164,078 B2 * | 11/2021 | Jin | G06N 3/048 |
| 2007/0255543 A1 * | 11/2007 | Chatfield | G06Q 10/04 |
| | | | 703/6 |
| 2017/0039188 A1 * | 2/2017 | Allen | G06F 40/263 |

FOREIGN PATENT DOCUMENTS

WO WO-2011059537 A1 * 5/2011 ......... G06F 17/5009

OTHER PUBLICATIONS

Grégoire Montavon, Geneviève B. Orr, Klaus-Robert Müller, Neural Networks: Tricks of the Trade. Springer, Sep. 2012, Second edition. (Year: 2012).*

(Continued)

*Primary Examiner* — Omar F Fernandez Rivas
(74) *Attorney, Agent, or Firm* — NORTON ROSE FULBRIGHT CANADA LLP

(57) ABSTRACT

Disclosed are systems, methods, and devices for out-of-sample representation learning using knowledge graphs. An embedding data structure reflective of a knowledge graph embedding model is received. A training data set including a plurality of training data entries, each of the training data entries reflective of a head entity, a tail entity, and a relation therebetween, wherein at least one of the head entities or the tail entities includes an out-of-sample entity, is received. A plurality of knowledge graph embedding model processors is provided. A random number is generated and compared to at least one criterion. A knowledge graph embedding model processor is selected from among the plurality of knowledge graph embedding model processors based at least in part on the comparing. The embedding data structure is processed with the selected knowledge graph embedding model processor.

19 Claims, 15 Drawing Sheets

(51) Int. Cl.
G06F 16/901 (2019.01)
G06N 3/045 (2023.01)
G06N 5/022 (2023.01)

(56) References Cited

OTHER PUBLICATIONS

Takuo Hamaguchi, Hidekazu Oiwa, Masashi Shimbo, Yuji Matsumoto; Knowledge Transfer for Out-of-Knowledge-Base Entities: A Graph Neural Network Approach,https://arxiv.org/abs/1706.05674, Jun. 2017 (Year: 2017).*

James Bergstra, Yoshua Bengio, "Random Search for Hyper-Parameter Optimization", JMLR, https://www.jmlr.org/papers/volume13/bergstra12a/bergstra12a.pdf, Feb. 2012, (Year: 2012).*

Bollacker et al.; Freebase: A Collaboratively Created Graph Database For Structuring Human Knowledge; SIGMOD '08: Proceedings of the ACM SIGMOD International Conference on Management of Data, Jun. 2008.

Bordes et al.; Translating Embeddings for Modeling Multi-relational Data; NIPS'13: Proceedings of the 26th International Conference on Neural Information Processing Systems—vol. 2, Dec. 2013.

Chen et al; FastGCN: Fast Learning with Graph Convolutional Networks via Importance Sampling; International Conference on Learning Representations (ICLR 2018)—arXiv:1801.10247v1.

Defferrard et al.; Convolutional Neural Networks on Graphs with Fast Localized Spectral Filtering; NIPS'16: Proceedings of the 30th International Conference on Neural Information Processing Systems, Dec. 2016.

Dettmers et al.; Convolutional 2D Knowledge Graph Embeddings; Proceedings of the 32th AAAI Conference on Artificial Intelligence, 2018, pp. 1811-1818.

Duchi et al.; Adaptive Subgradient Methods for Online Learning and Stochastic Optimization; Journal of Machine Learning Research, vol. 12, pp. 2121-2159, Jul. 2011.

Hamilton et al.; Inductive Representation Learning on Large Graphs; NIPS'17: Proceedings of the 31st International Conference on Neural Information Processing Systems, Dec. 2017.

Hamilton et al.; Representation Learning on Graphs: Methods and Applications; IEEE Data Engineering Bulletin, vol. 40, pp. 52-74, 2017.

Hammond et al.; Wavelets on graphs via spectral graph theory; Applied and Computational Harmonic Analysis, vol. 30, Issue 2, Mar. 2011, pp. 129-150.

Ji et al.; Knowledge Graph Embedding via Dynamic Mapping Matrix; Proceedings of the 53rd Annual Meeting of the Association for Computational Linguistics and the 7th International Joint Conference on Natural Language Processing (vol. 1: Long Papers), pp. 687-696, Beijing, China, Jul. 26-31, 2015.

Kazemi et al.; SimplE Embedding for Link Prediction in Knowledge Graphs; NIPS'18: Proceedings of the 32nd International Conference on Neural Information Processing Systems, Dec. 2018.

Kipf et al.; Semi-Supervised Classification with Graph Convolutional Networks; International Conference on Learning Representations (ICLR 2017)—arXiv:1609.02907v4.

Ma et al.; DepthLGP: Learning Embeddings of Out-of-Sample Nodes in Dynamic Networks; Proceedings of the 32th AAAI Conference on Artificial Intelligence, 2018, pp. 370-377.

Miller, George A.; WordNet: A Lexical Database for English; Communications of the ACM, Nov. 1995, vol. 38, No. 11, pp. 39-41.

Zhang et al.; Inductive Matrix Completion Based on Graph Neural Networks; International Conference on Learning Representations (ICLR 2020)—arXiv:1904.12058v3.

Nguyen et al.; STransE: a novel embedding model of entities and relationships in knowledge bases; Proceedings of the 2016 Conference of the North American Chapter of the Association for Computational Linguistics: Human Language Technologies, Jun. 2016, pp. 460-466.

Nickel et al.; A Review of Relational Machine Learning for Knowledge Graphs; Proceedings of the IEEE, vol. 104, No. 1, pp. 11-33, Jan. 2016—arXiv:1503.00759v3.

Paszke et al.; Automatic Differentiation in PyTorch; 31st Conference on Neural Information Processing Systems (NIPS 2017).

Schlichtkrull et al.; Modeling Relational Data with Graph Convolutional Networks; ESWC 2018—arXiv:1703.06103v4.

Sun et al.; RotatE: Knowledge Graph Embedding by Relational Rotation in Complex Space; International Conference on Learning Representations (ICLR 2019)—arXiv:1902.10197v1.

Teru et al.; Inductive Relation Prediction on Knowledge Graphs; arXiv:1911.06962v1.

Toutanova et al.; Observed versus latent features for knowledge base and text inference; Proceedings of the 3rd Workshop on Continuous Vector Space Models and their Compositionality (CVSC), pp. 57-66, 2015.

Trouillon et al.; Complex Embeddings for Simple Link Prediction; Proceedings of the 33rd International Conference on Machine Learning (ICML 2016), vol. 48, 2016.

Veličković et al.; Graph Attention Networks; International Conference on Learning Representations (ICLR 2018)—arXiv:1710.10903v3.

Xie et al.; Representation Learning of Knowledge Graphs with Entity Descriptions; Proceedings of the Thirtieth AAAI Conference on Artificial Intelligence (AAAI-16), Feb. 2016, pp. 2659-2665.

Yang et al.; Embedding Entities and Relations for Learning and Inference in Knowledge Bases; International Conference on Learning Representations (ICLR 2015)—arXiv:1412.6575v4.

Yang et al.; Revisiting Semi-Supervised Learning with Graph Embeddings; Proceedings of The 33rd International Conference on Machine Learning (ICML 2016), vol. 48, 2016.

Zhang et al.; Quaternion Knowledge Graph Embedding; 33rd Conference on Neural Information Processing Systems (NeurIPS 2019)—arXiv:1904.10281v3.

Zhao et al.; Zero-Shot Embedding for Unseen Entities in Knowledge Graph; IEICE Transactions on Information and Systems, vol. E100.D, No. 7, pp. 1440-1447, Jul. 2017.

Fatemi et al.; Knowledge Hypergraphs: Prediction Beyond Binary Relations; Proceedings of the Twenty-Ninth International Joint Conference on Artificial Intelligence (IJCAI-20), pp. 2191-2197.

Goel et al.; Diachronic Embedding for Temporal Knowledge Graph Completion; arXiv:1907.03143v1.

Hajimoradlou et al.; Stay Positive: Knowledge Graph Embedding Without Negative Sampling; Graph Representation Learning and Beyond Workshop (ICML 2020).

Hamaguchi et al.; Knowledge Transfer for Out-of-Knowledge-Base Entities: A Graph Neural Network Approach; Proceedings of the Twenty-Sixth International Joint Conference on Artificial Intelligence (IJCAI-17), pp. 1802-1808.

Kingma et al.; Adam: A Method for Stochastic Optimization; International Conference on Learning Representations (ICLR 2015)—arXiv:1412.6980v9.

* cited by examiner

Algorithm 1 Transductive Training (one epoch)

Inputs $n$ : negative ratio, $\mathcal{L}$ : loss function

1: for $batch = 1$ to $numBatches$ do
2:    $triples, labels \leftarrow$ nextBatch$(batch, n)$
3:    $scores \leftarrow [\,]$
4:    for $(v, r, u)$ in $triples$ do
5:       $z_v \leftarrow$ lookup$(v, Z_{ent})$
6:       $z_r \leftarrow$ lookup$(r, Z_{rel})$
7:       $z_u \leftarrow$ lookup$(u, Z_{ent})$
8:       $scores$.append$(\phi(z_v, z_r, z_u))$
9:    end for
10:   updateParams$(\mathcal{L}, scores, labels)$
11: end for

FIG. 3A

Algorithm 2 Out-of-Sample Training (one epoch)

Inputs $n$ : negative ratio, $\mathcal{L}$ : loss function, $\psi$ :

1: for $batch = 1$ to $numBatches$ do
2:    $triples, labels \leftarrow$ nextBatch$(batch, n)$
3:    $scores \leftarrow []$
4:    for $(v, r, u)$ in $triples$ do
5:      $z_r \leftarrow$ lookup$(r, Z_r)$
6:      $rand \leftarrow$ random$()$
7:      if $rand < \frac{\psi}{2}$ then
8:         $z_v \leftarrow$ aggregate$(v, Z_{rels}, Z_{ent})$
9:         $z_u \leftarrow$ lookup$(u, Z_{ent})$
10:      else if $\frac{\psi}{2} < rand < \psi$ then
11:         $z_v \leftarrow$ lookup$(v, Z_{ent})$
12:         $z_u \leftarrow$ aggregate$(u, Z_{rel}, Z_{ent})$
13:      else
14:         $z_v \leftarrow$ lookup$(v, Z_{ent})$
15:         $z_u \leftarrow$ lookup$(u, Z_{ent})$
16:      end if
17:      $scores$.append$(\phi(z_v, z_r, z_u))$
18:    end for
19:    updateParams$(\mathcal{L}, scores, labels)$
20: end for

FIG. 3B

| Dataset | In-sample entities ($|V|$) | Out-of-sample entities | $|R|$ | Train triples | Validation queries | Test queries |
|---|---|---|---|---|---|---|
| oWN18RR | 32270 | validation: 2848, test: 2848 | 11 | 60608 | 12760 | 12440 |
| oFB15k-237 | 11579 | validation: 1395, test: 1396 | 234 | 193490 | 44601 | 54082 |

Table 1: Statistics on oWN18RR and oFB15k-237.

FIG. 4A

| Model | Training | oWN18RR | | | | | oFB15k-237 | | | |
|---|---|---|---|---|---|---|---|---|---|---|
| | | MRR Filtered | Hit@ 1 | Hit@ 3 | Hit@ 10 | | MRR Filtered | Hit@ 1 | Hit@ 3 | Hit@ 10 |
| Popularity | Algorithm 1 | 0.0094 | 0.0030 | 0.0076 | 0.0215 | | 0.0320 | 0.0168 | 0.0322 | 0.0581 |
| OOV | Algorithm 1 | 0.0004 | 0.0000 | 0.0001 | 0.0002 | | 0.0002 | 0.0000 | 0.0000 | 0.0001 |
| RGCN-D | Algorithm 1 | 0.0178 | 0.0072 | 0.0166 | 0.0352 | | 0.1683 | 0.0974 | 0.1848 | 0.3056 |
| DistMult-EAvg | Algorithm 1 | 0.0446 | 0.0248 | 0.0469 | 0.0841 | | 0.0813 | 0.0525 | 0.0973 | 0.1327 |
| DistMult-ERAvg | Algorithm 1 | 0.3348 | 0.2468 | 0.3331 | 0.4159 | | 0.2456 | 0.1615 | 0.2760 | 0.4082 |
| DistMult-LS | Algorithm 1 | 0.3514 | 0.2840 | 0.3911 | 0.4756 | | 0.2073 | 0.1395 | 0.2264 | 0.3375 |
| DistMult-LS-U | Algorithm 1 | 0.3238 | 0.2458 | 0.3603 | 0.4717 | | 0.1674 | 0.1099 | 0.1858 | 0.2732 |
| oDistMult-EAvg | Algorithm 2 | 0.2239 | 0.1315 | 0.2724 | 0.3897 | | 0.1765 | 0.0724 | 0.2076 | 0.4012 |
| oDistMult-ERAvg | Algorithm 2 | 0.3904 | 0.3460 | 0.4125 | 0.4725 | | 0.2557 | 0.1608 | 0.2885 | 0.4201 |
| oDistMult-LS | Algorithm 2 | 0.4003 | 0.3643 | 0.4371 | 0.4892 | | 0.2126 | 0.1232 | 0.2404 | 0.3954 |

FIG. 4B

| Model | MRR | Hit@1 | Hit@3 | Hit@10 |
|---|---|---|---|---|
| DistMult | 0.4498 | 0.4179 | 0.4614 | 0.5099 |
| oDistMult-ERAvg | 0.4483 | 0.4072 | 0.4711 | 0.5210 |

FIG. 7

SYSTEM AND METHOD FOR OUT-OF-SAMPLE REPRESENTATION LEARNING

CROSS-REFERENCE TO RELATED APPLICATIONS

This application claims all benefit including priority to U.S. Provisional Patent Application 62/963,591, filed Jan. 21, 2020, and entitled "SYSTEM AND METHOD FOR OUT-OF-SAMPLE REPRESENTATION LEARNING"; the entire contents of which are hereby incorporated by reference herein.

FIELD

This disclosure relates to machine learning, and more specifically to out-of-sample representation learning.

BACKGROUND

Many important problems can be formulated as reasoning in knowledge graphs (KGs). Representation learning has proved extremely effective for transductive reasoning, in which one needs to make new predictions for already observed entities. This is true for both attributed graphs (where each entity has an initial feature vector) and non-attributed graphs (where the only initial information derives from known relations with other entities). However, there remains a need for advancement in out-of-sample reasoning, where one needs to make predictions for entities that were unseen at training time.

SUMMARY

In an aspect, there is provided a computer-implemented method for out-of-sample representation learning using knowledge graphs. The method includes: receiving an embedding data structure reflective of a knowledge graph embedding model; receiving a training data set including a plurality of training data entries, each of the training data entries reflective of a head entity, a tail entity, and a relation therebetween, wherein at least one of the head entities or the tail entities includes an out-of-sample entity; providing a plurality of knowledge graph embedding model processors; for a given training data entry of the plurality of training data entries, the given training data entry reflective of a given head entity, a given tail entity, and a given relation: generating a random number and comparing the random number to at least one criterion; selecting a first knowledge graph embedding model processor from among the plurality of knowledge graph embedding model processors based at least in part on the comparing; processing the embedding data structure with the first knowledge graph embedding model processor to: retrieve, from the knowledge graph data structure, a tail embedding for the given tail entity; and calculate a head embedding for the given head entity; retrieving, from the knowledge graph data structure, a relation embedding for the given relation; and upon processing the head embedding, the tail embedding, and the relation embedding, calculating a score reflective of a degree of belief that the given relation holds between the given head entity and the given tail entity.

The method may further include: for another given training data entry of the plurality of training data entries, the another training data entry reflective of another given head entity, another given tail entity, and another given relation: generating another random number and comparing the another random number to the at least one criterion; selecting a second knowledge graph embedding model processor from among the plurality of knowledge graph embedding model processors based at least in part on the comparing; processing the embedding data structure with the second knowledge graph embedding model processor to: retrieve, from the knowledge graph data structure, a head embedding for the another given head entity; and calculate a tail embedding for the another given tail entity.

The method may further include: for yet another given training data entry of the plurality of training data entries, the yet another training data entry reflective of yet another given head entity, yet another given tail entity, and yet another given relation: generating yet another random number and comparing the yet another random number to the at least one criterion; selecting a third knowledge graph embedding model processor from among the plurality of knowledge graph embedding model processors based at least in part on the comparing; processing the embedding data structure with the third knowledge graph embedding model processor to: retrieve, from the knowledge graph data structure, a head embedding for the yet another given head entity and a tail embedding for the yet another given tail entity.

In another aspect, there is provided a computer-implemented system for out-of-sample representation learning using knowledge graphs. The system includes: at least one processor; memory in communication with the at least one processor, and software code stored in the memory, which when executed by the at least one processor causes the system to: receive an embedding data structure reflective of a knowledge graph embedding model; receive a training data set including a plurality of training data entries, each of the training data entries reflective of a head entity, a tail entity, and a relation therebetween, wherein at least one of the head entities or the tail entities includes an out-of-sample entity; provide a plurality of knowledge graph embedding model processors; for a given training data entry of the plurality of training data entries, the given training data entry reflective of a given head entity, a given tail entity, and a given relation: generate a random number and compare the random number to at least one criterion; select a first knowledge graph embedding model processor from among the plurality of knowledge graph embedding model processors based at least in part on the comparison; process the embedding data structure with the first knowledge graph embedding model processor to: retrieve, from the knowledge graph embedding model data structure, a tail embedding for the given tail entity; and calculate a head embedding for the given head entity; retrieve, from the knowledge graph embedding model data structure, a relation embedding for the given relation; and upon processing the head embedding, the tail embedding, and the relation embedding, calculate a score reflective of a degree of belief that the given relation holds between the given head entity and the given tail entity.

The system may be such that the software code stored in the memory, when executed by the at least one processor further causes the system to: for another given training data entry of the plurality of training data entries, the another training data entry reflective of another given head entity, another given tail entity, and another given relation: generate another random number and compare the another random number to the at least one criterion; select a second knowledge graph embedding model processor from among the plurality of knowledge graph embedding model processors based at least in part on the comparison; process the embedding data structure with the second knowledge graph embedding model processor to: retrieve, from the knowledge graph embedding model data structure, a head embedding for the another given head entity; and calculate a tail embedding for the another given tail entity.

The system may be such that the software code stored in the memory, when executed by the at least one processor further causes the system to: for yet another given training data entry of the plurality of training data entries, the yet another training data entry reflective of yet another given head entity, yet another given tail entity, and yet another given relation: generate yet another random number and compare the yet another random number to the at least one criterion; select a third knowledge graph embedding model processor from among the plurality of knowledge graph embedding model processors based at least in part on the comparison; process the embedding data structure with the third knowledge graph embedding model processor to: retrieve, from the knowledge graph embedding model data structure, a head embedding for the yet another given head entity and a tail embedding for the yet another given tail entity.

In yet another aspect, there is provided a non-transitory computer-readable medium having stored thereon machine interpretable instructions which, when executed by a processor, cause the processor to perform the foregoing method.

Many further features and combinations thereof concerning embodiments described herein will appear to those skilled in the art following a reading of the instant disclosure.

DESCRIPTION OF THE FIGURES

In the figures,

FIG. 3A shows pseudocode for transductive training, in accordance with an embodiment;

FIG. 3B shows pseudocode for out-of-sample training, in accordance with an embodiment;

FIG. 4A shows a table summarizing statistics for datasets, in accordance with an embodiment;

FIG. 4B shows a table summarizing results, in accordance with an embodiment;

FIG. 7 shows a table summarizing in-sample link prediction results comparing systems trained according to out-of-sample training to a system trained using transductive training, in accordance with an embodiment;

DETAILED DESCRIPTION

Disclosed herein are methods, devices, and systems for out-of-sample representation learning using knowledge graphs (KGs).

KGs are graph-structured knowledge bases where nodes represent entities and labeled edges represent relationships between entities. Several prediction problems can be formulated as reasoning in a KG (e.g., a job recommendation system can be formulated as reasoning over the KG). In out-of-sample KG reasoning, predictions are to be made for previously unseen entities (hereafter referred to as out-of-sample entities) given their relationships with already observed entities (hereafter referred to as in-sample entities).

In this disclosure, lower-case letters denote scalars, bold lower-case letters denote vectors, and bold upper-case letters denote matrices. For a vector $z \in \mathbb{R}^d$, represent by $z[n]$ ($n \geq d$) the $n^{th}$ element of z and by $\|z\|$ the Euclidean norm of z. For $z_1, z_2 \in \mathbb{R}^d$, let $z_1 \odot z_2 \in \mathbb{R}^d$ represent the element-wise (Hadamard) product of the two vectors. For $z_1, \ldots, z_k \in \mathbb{R}^d$, let $\langle z_1, \ldots, z_k \rangle = \sum_{n=1}^{d} (z_1[n] * \ldots * z_k[n])$ represent the sum of the element-wise product of the elements of the k vectors.

Let $\mathcal{V}$ represent a set of entities and $\mathcal{R}$ represent a set of relations. In this disclosure, a triple is represented as $(v, r, u)$, where $v \in \mathcal{V}$ is the head (or subject), $r \in \mathcal{R}$ is the relation, and $u \in \mathcal{V}$ is the tail (or object) of the triple. Let $\zeta$ represent the set of all triples on entities $\mathcal{V}$ and relations $\mathcal{R}$ that are facts (e.g., (Montreal, LocatedIn, Canada)). A knowledge graph (KG) $\mathcal{G} \subset \zeta$ is a subset of $\zeta$.

Figure 1:
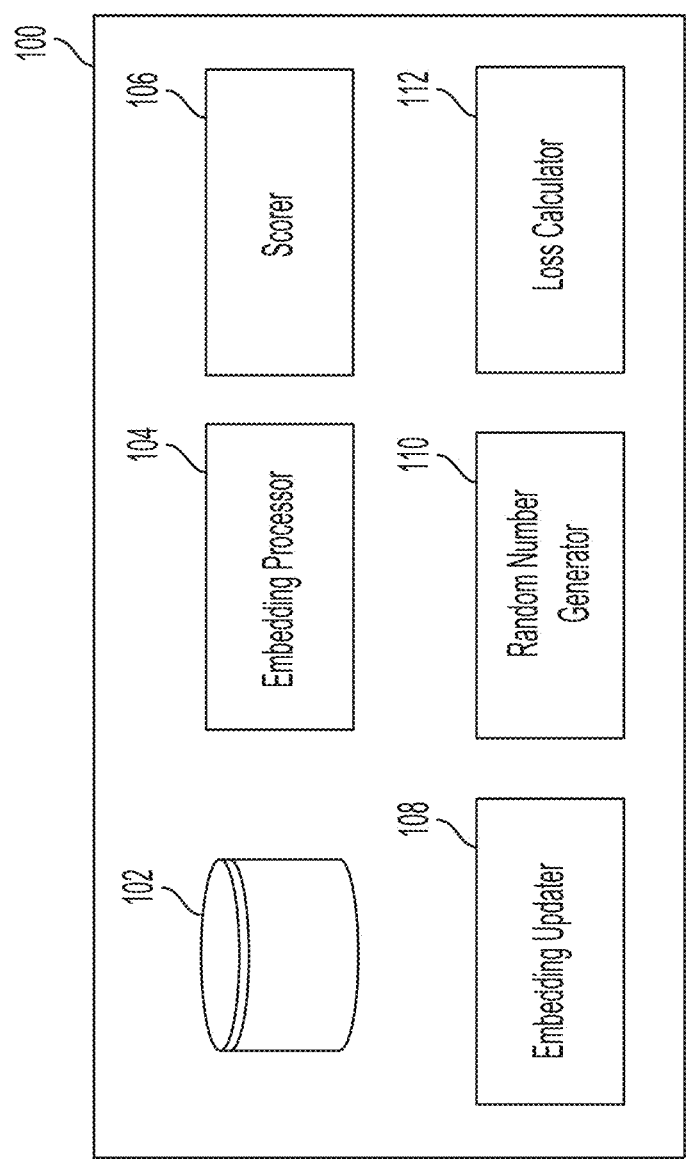
FIG. 1 is a high-level schematic diagram of a learning system, in accordance with an embodiment.

FIG. 1 depicts a learning system 100, in accordance with an embodiment. Learning system 100 is adapted to perform out-of-sample representation learning using knowledge graphs, in manners disclosed herein.

As depicted, learning system 100 includes an electronic datastore 102, an embedding processor 104, a scorer 106, an embedding updater 108, a random number generator 110, and a loss calculator 112.

Electronic datastore 102 is configured to store various data utilized by learning system 100 including, for example, data reflective of knowledge graphs, data reflective of knowledge graph embedding models including one or more knowledge graph embedding model data structures, training data, model parameters, hyperparameters, and the like. Electronic datastore 102 may implement a conventional relational or object-oriented database, such as Microsoft SQL Server, Oracle, DB2, Sybase, Pervasive, MongoDB, NoSQL, or the like.

Embedding processor 104 obtains embeddings for particular entities and relations (e.g., entities v and u, and relation r) of a knowledge graph. Embedding processor 104 may retrieve embeddings from a knowledge graph embedding model data structure. Embedding processor 104 may compute embeddings in various manners as detailed herein.

Scorer 106 computes a score for a triple, e.g., using embeddings for a head entity, a relation, and a tail entity (e.g., v, r, u). This score corresponds to the degree of belief the model has for the relation holding between the head and tail entities. In an embodiment, scorer 102 computes a score using a scoring function referred to as "DistMult" herein. In other embodiments, other scoring functions may be used.

Embedding updater 108 updates embeddings based on learning at learning system 100. In particular, embedding updater 108 updates learnable parameters of embeddings. In an embodiment, embedding updater 108 also updates learnable parameters of scoring functions and/or learnable parameters of functions for computing embeddings. Embedding updater 108 may update learnable parameters based on a calculated loss, e.g., as calculated by loss calculator 112. Updating a learnable parameter may include, for example, calculating a loss gradient with respect to each learnable parameter. Updating a learnable parameter may include, for example, applying stochastic gradient descent.

Random number generator 110 generates random numbers (including pseudorandom numbers) to allow certain computational steps to be taken with a given probability. Random number generator 110 may generate random numbers using a pseudorandom number generator.

Loss calculator 112 computes a loss for one or more triples using a loss function.

Each of embedding processor 104, scorer 106, embedding updater 108, random number generator 110, and loss calculator 112 may be implemented using conventional programming languages such as Java, J #, C, C++, C #, R, Perl, Visual Basic, Ruby, Scala, etc. These components of system 100 may be in the form of one or more executable programs, scripts, routines, statically/dynamically linkable libraries, or servlets.

Figure 2:
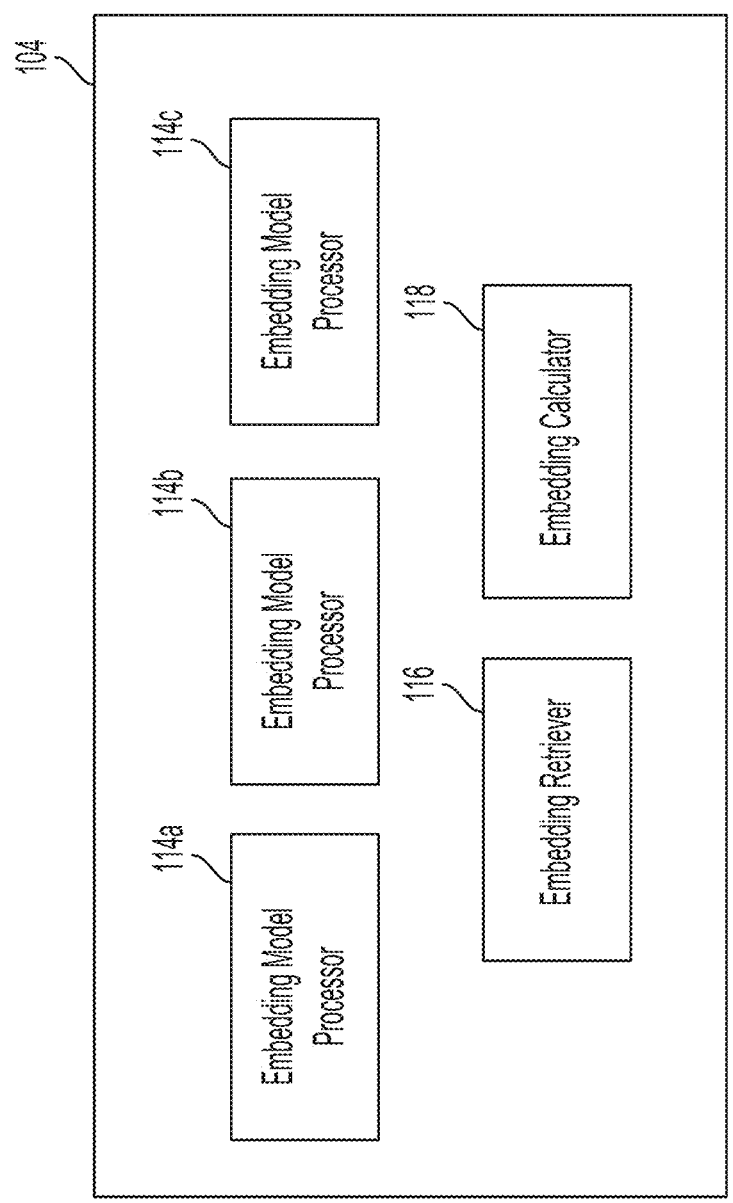
FIG. 2 is a high-level schematic diagram of an embedding processor of the learning system of FIG. 1, in accordance with an embodiment.

FIG. 2 is a high-level schematic diagram of embedding processor 104, in accordance with an embodiment. As depicted, of embedding processor 104 includes knowledge graph embedding model processors 114a, 114b, 114c, embedding retriever 116, and embedding calculator 118.

Knowledge graph embedding model processors 114a, 114b, 114c may be referred to individually as a knowledge graph embedding model processor 114 or in a plurality as knowledge graph embedding model processors 114.

Each of these knowledge graph embedding model processors 114 obtains embeddings corresponding to a head, a tail, or a relation in a particular manner. For example, such particular manner may differ from the respective manners of other knowledge graph embedding model processors 114.

In the depicted embodiment, knowledge graph embedding model processor 114a retrieves a tail embedding and a relation embedding using embedding retriever 116 and calculates a head embedding using embedding calculator 118; knowledge graph embedding model processor 114b retrieves a head embedding and a relation embedding using embedding retriever 116 and calculate a tail embedding using embedding calculator 118; and knowledge graph embedding model processor 114c retrieves a head embedding, a tail embedding, and a relation embedding using embedding retriever 116.

Other configurations of knowledge graph embedding model processors 114 are possible. For example, there can be a greater or fewer number of knowledge graph embedding model processors 114 than shown in FIG. 2.

Random number generator 110 may be used to determine which of the knowledge graph embedding model processors are used in plurality of knowledge graph embedding model processors 114.

Embedding retriever 116 retrieves embeddings for particular entities and relations (e.g., entities v and u, and relation r) from a knowledge graph embedding model data structure, and may store them in electronic datastore 102. For example, embedding retriever 116 may retrieve embeddings by performing embedding lookups in manners detailed herein.

Embedding calculator 118 computes embeddings for particular entities (e.g., entities v and u). In an embodiment, embedding calculator 118 computes embeddings using an approach referred to as "oDistMult-ERAvg" herein. In another embodiment, embedding calculator 118 computes embeddings using an approach referred to as "oDistMult-LS" herein. In other embodiments, other approaches for computing embeddings may be used (e.g., SimplE, ComplEx, and QuatE, or the like).

Transductive KG Reasoning

In transductive KG reasoning, a model is learned for a KG G with entities V and relations R such that during operation, the model can make predictions for any triple (v, r, u) where v,u∈V are both in-sample entities and r∈R.

KG embedding models map entities and relations to hidden representations known as embeddings and define a function $\phi$ (potentially with learnable parameters $\theta$) from the embeddings of the entities and the relation in a triple to a score corresponding to the degree of belief the model has for the relation holding between the entities. Typically, the embeddings can be formulated as two matrices $Z_{ent} \in \mathbb{R}^{|V| \times d_{ent}}$ and $Z_{rel} \in \mathbb{R}^{|R| \times d_{rel}}$ where each row of $Z_{ent}$ corresponds to the embedding for an entity, each row of $Z_{rel}$ corresponds to the embedding for a relation, $d_{ent}$ represents the entity embedding size, and $d_{rel}$ represents the relation embedding size.

Embedding retriever 116 can look up the embedding for a particular entity by multiplying the transpose of $Z_{ent}$ to the one-hot encoding of that entity and for a particular relation r by multiplying the transpose of $Z_{rel}$ to the one-hot encoding of r.

In some embodiments, $Z_{ent}$ and $Z_{rel}$ may be defined as matrices with directly learnable parameters. In other embodiments, encoders are provided which produce these two matrices typically through several rounds of message passing among entities.

FIG. 3A depicts an Algorithm 1 that provides a high-level description of one epoch of the training procedure that can be implemented by learning system 100 for learning the embeddings and learning the parameters of the $\phi$ function, in accordance with an embodiment. The training is performed using stochastic gradient descent with mini-batches.

For each batch (line 2), a set of positive triples are extracted from the KG and n negative triples are created for each positive triple by corrupting the positive triple according to the procedure introduced in Bordes et al. (Antoine Bordes, Nicolas Usunier, Alberto Garcia-Duran, Jason Weston, and Oksana Yakhnenko. 2013. Translating embeddings for modeling multirelational data. In *NeurIPS*, pages 2787-2795). n is known as the negative ratio. For each triple (v, r, u) in the batch, the embeddings for v,r and u are looked up by embedding retriever 116 and the score for the triple is computed according to $\phi$ by scorer 104.

Then for the batch, the embeddings and the parameters of $\phi$ are updated by embedding updater 108 based on the computed scores, the labels of the triples, a loss computed by loss calculator 112.

Various embodiments of scorer 106 can implement differing scoring functions. In some embodiments, the embeddings vector is broken up into multiple pieces and each piece is reshaped before using it in the score function.

In some embodiments, the model for transductive KG embedding that is used is is DistMult (Bishan Yang, Wen-tau Yih, Xiaodong He, Jianfeng Gao, and Li Deng. 2015. Embedding entities and relations for learning and inference in knowledge bases. ICLR). In DistMult, $Z_{ent} \in \mathbb{R}^{|V| \times d}$ and $Z_{rel} \in \mathbb{R}^{|R| \times d}$. For a triple (v, r, u), let $z_v$, $z_r$, $z_u \in \mathbb{R}^d$ represent the embeddings for v, r and u respectively where each embedding is obtained by looking up the $Z_{ent}$ and $Z_{rel}$ matrices. DistMult defines the score for the triple as $\phi(z_v, z_r, z_u) = \langle z_v, z_r, z_u \rangle$, i.e. the sum of the element-wise product of the head, relation, and tail embeddings.

In other embodiments, models for transductive KG embedding other than DistMult may be used.

The loss is computed by loss calculator 112 using a loss function. In one embodiment, loss calculator 112 implements the L2 regularized negative log-likelihood (Théo Trouillon, Johannes Welbl, Sebastian Riedel, Éric Gaussier, and Guillaume Bouchard. 2016. Complex embeddings for simple link prediction. In *ICML*, pages 2071-2080; Seyed Mehran Kazemi and David Poole. 2018. SimplE embedding for link prediction in knowledge graphs. In NeurIPS, pages 4289-4300). The loss L(Θ) for a single batch of labeled triples is defined as follows:

$$\sum_{((v,r,u),l)\in batch} \text{softplus}(-l \cdot \phi(v, r, u)) + \lambda\|\Theta\|_2^2 \quad (1)$$

where Θ represents the parameters of the model, softplus (x)=log(1+exp(x)), l∈{−1,1} represents the label of the triple in the batch, and λ represents the L2 regularization hyperparameter. In other embodiments, scorer 106 can implement a different scoring function.

Out-of-Sample Representation Learning

Out-of-sample reasoning for KGs is the problem of training a model on a KG $\mathcal{G}$ with entities $\mathcal{V}$ and relations $\mathcal{R}$ such that at the test time, the model can be used for making predictions about any out-of-sample entity v∉$\mathcal{V}$ given $\mathcal{G}_v$={(v, r, u):u∈$\mathcal{V}$, r∈$\mathcal{R}$ }∪{(u, r, v):u∈$\mathcal{V}$, r∈$\mathcal{R}$ } corresponding to the relations between v and in-sample entities.

According to the definition, $\mathcal{G}_v$ is observed only at the test time and so during training, the model does not observe any triples involving v. To develop a representation learning model for out-of-sample reasoning in KGs, learning system 100 needs to learn i) embeddings for the in-sample entities in $\mathcal{V}$ and the relations in $\mathcal{R}$, ii) a function—from triples to scores, and iii) a function from $\mathcal{G}_v$ and the in-sample entity and relation embeddings to an embedding for v that can be used to make further predictions about v.

One possible way of extending transductive models such as DistMult to the out-of-sample domain is by following the standard training procedure outlined in Algorithm 1 and then defining an aggregation function with no learnable parameters which, at the inference time, provides an embedding for an out-of-sample entity v based on the embeddings of the entities and relations in $\mathcal{G}_v$. A simple aggregation function, for instance, can be the average of the embeddings for entities in $\mathcal{G}_v$. Such a procedure, however, introduces an inconsistency between training and testing as the training is done irrespective of the aggregation function and with the objective of performing well on a transductive task whereas the model is tested on an out-of-sample task.

FIG. 3B depicts an Algorithm 2 that provides a training procedure for one epoch of out-of-sample representation learning, in accordance with an embodiment. Algorithm 2 may be implemented in an embodiment of learning system 100 to perform out-of-sample representation learning. The procedure depicted in Algorithm 2 takes into account the aggregation function that will be used at inference time and the aforementioned inconsistency issue may be ameliorated in the depicted embodiment.

According to Algorithm 2, for each triple (v, r, u) in the batch, embedding retriever 116 performs a lookup of the embedding for r.

With probability ψ/2, where 0≤ψ≤1 is a hyperparameter, a particular knowledge graph embedding model processor 114 is selected from the plurality of knowledge graph embedding model processors 114. For example, the selected knowledge graph embedding model processor 114 may be knowledge graph embedding model processor 114*a*. The selected knowledge graph embedding model processor 114*a* can determine, for example, that v is considered to be to be out-of-sample and u is considered to be in-sample. In this case, embedding calculator 118 uses an aggregate function to compute the embedding for v according to the triples involving v except for (v, r, u), and for u embedding retriever 116 performs a lookup of its embedding.

Also with probability ψ/2, another particular knowledge graph embedding model processor 114 is selected from plurality of knowledge graph embedding model processors 114. For example, the selected knowledge graph embedding model processor 114 may be knowledge graph embedding model processor 114*b*. The selected knowledge graph embedding model processor 114*b* can determine, for example, that u is considered to be out-of-sample and v is considered to be in-sample and a similar procedure is followed.

With probability 1-ψ, yet another particular knowledge graph embedding model processor 114 is selected from plurality of knowledge graph embedding model processors 114. For example, the selected knowledge graph embedding model processor 114 may be knowledge graph embedding model processor 114*c*. The selected knowledge graph embedding model processor 114*c* instructs embedding retriever 116 to look up the embedding for both entities. Having the embeddings for v, r and u, scorer 106 uses a score function (e.g., DistMult) to compute the score for this triple being true. Then for the batch, the embeddings (and the parameters of the aggregate and φ functions if they have any) are updated by embedding updater 108 according to the computed scores, labels, and a loss computed by loss calculator 112 using a loss function.

In one specific embodiment, embedding calculator 118 implements an aggregate function referred to herein as "oDistMult-ERAvg", detailed as follows.

Let v be an entity for which embedding calculator 118 needs to compute an embedding using aggregation and $\mathcal{G}_v$ be the triples involving v. According to the score function of DistMult, for each triple (v, r, u)∈$\mathcal{G}_v$ (and similarly for each triple (u, r, v)∈$\mathcal{G}_v$), it is desirable to have $\langle z_v, z_r, z_u \rangle$ be high where $z_v$, $z_r$ and $z_u$ represent the embedding of v, r and u respectively. The score can be written as $\langle z_v, z_r, z_u \rangle = z_v \cdot (z_r \odot z_u)$ where · represents dot product. Since $z_v \cdot (z_r \odot z_u) = \|z_v\| \|z_r \odot z_u\| \cos(z_v, z_r \odot z_u)$, one possible choice to ensure a high value for $\langle z_v, z_r, z_u \rangle$ is by choosing $z_v$ to be the vector $z_r \odot z_u$ so that the angle θ between the two vectors becomes 0 (and consequently, cos(θ)=1). Since there may be multiple triples in $\mathcal{G}_v$, embedding calculator 118 can average these vectors and define $z_v$=aggregate(v) as follows:

$$z_v = \frac{1}{|\mathcal{G}_v|}\left(\sum_{(v,r,u)\in \mathcal{G}_v} z_r \odot z_u + \sum_{(v,r,u)\in \mathcal{G}_v} z_{r'} \odot z_{u'}\right) \quad (2)$$

where |$\mathcal{G}_v$| represents the number of triples in $\mathcal{G}_v$.

In another specific embodiment, embedding calculator 118 implements an aggregate function referred to herein as "oDistMult-LS", detailed as follows.

An alternative to the averaging strategy in Equation (2) is to find $z_v$ as the solution to a least squares problem to ensure the score for the triples in $\mathcal{G}_v$ are maximized. One way to achieve this goal is by solving a (potentially underdetermined) system of linear equations where there exists one equation of the form $$\frac{z_v \cdot (z_r \odot z_u)}{\|z_v\| \|z_r \odot z_u\|} = 1 \quad (5)$$

for each triple $(v, r, u) \in \mathcal{G}_v$ (and similarly for each triple $(u, r, v) \in \mathcal{G}_v$). The presence of $\|z_v\|$ in the denominator makes finding an analytical solution difficult. Noting that $\|z_v\|$ only affects the magnitude of the scores and not their ranking, the following equation can be used:

$$\frac{z_v \cdot (z_r \odot z_u)}{\|z_r \odot z_u\|} = 1 \quad (3)$$

Considering a matrix $A \in \mathbb{R}^{|\mathcal{G}_v| \times d}$ (recall that d is the embedding dimension) such that $A[i] = z_r \odot z_u$ where r and u are the relation and entity involved in the i-th triple in $\mathcal{G}_v$ and a vector $b \in \mathbb{R}^{|\mathcal{G}_v|}$ such that $b[i] = \|z_r \odot z_u\|$, embedding calculator 118 can find $z_v$=aggregate(v) analytically as follows:

$$z_v = (A^T A + \lambda I)^{-1} A^T b \quad (4)$$

where $I \in \mathbb{R}^{d \times d}$ is an identity matrix and $\lambda$ is a hyperparameter corresponding to L2 regularization which ensures the system has a unique solution.

Though the above two example specific embodiments implement an aggregation functions for DistMult, other embodiments can extend to other models. Other embodiments can use models such as SimplE, ComplEx, and QuatE, or the like.

Assuming that $|\mathcal{G}_v|=N$ and the embedding dimension is d. Finding the embedding for v in oDistMult-ERAvg has a time complexity of O(Nd) as it requires computing N Hadamard products and then averaging the resulting vectors both having a time complexity of O(Nd).

For oDistMult-LS, to create the matrix A and vector b, embedding calculator 118 computes N Hadamard products and finds the norm of N vectors respectively. The time complexity of this step is O(Nd). The size of the matrix A is N×d so computing $A^T A$ has a time complexity of $O(Nd^2)$, the matrix inversion has a time complexity of $O(d^3)$ and the product of the resulting inverted matrix into $A^T$ also has a time complexity of $O(Nd^2)$. Therefore, the overall time complexity is $O(Nd^2+d^3)$. Unless the degree size of the KG is quite large, one can expect d to be larger than N and so the time complexity becomes $O(d^3)$.

Datasets were created for out-of-sample representation learning over KGs using WN18RR (Tim Dettmers, Pasquale Minervini, Pontus Stenetorp, and Sebastian Riedel. 2018. Convolutional 2d knowledge graph embeddings. In AAAI) and FB15k-237 (Kristina Toutanova and Danqi Chen. 2015. Observed versus latent features for knowledge base and text inference. In *Continuous Vector Space Models and their Compositionality*, pages 57-66), two standard datasets for KG completion. WN18RR is a subset of Wordnet (George A Miller. 1995. Wordnet: a lexical database for english. *Communications of the ACM*, 38 (11): 39-41) and FB15k-237 is a subset of Freebase (Kurt Bollacker, Colin Evans, Praveen Paritosh, Tim Sturge, and Jamie Taylor. 2008. Freebase: a collaboratively created graph database for structuring human knowledge. In ACM SIGMOD. AcM). The two datasets are referred to herein as oWN18RR and oFB15k-237 respectively, where "o" in the beginning of the name stands for "out-of-sample". The statistics for these datasets can be found in Table 1 (FIG. 4A).

The datasets were created in the following manner:
1. Merge the train, validation, and test triples from the original dataset into a single set.
2. From the entities appearing in at least 2 triples, randomly select 20% to be candidates for the out-of-sample entities; other entities are in-sample entities. Entities appearing in only 1 triple are avoided as out-sample entities as during test time, one triple is selected as query and other triples are needed for learning a representation for the out-of-sample entity.
3. Triples containing two out-of-sample entities are removed, triples with one out-of-sample entity are considered as test triples and other triples are considered as train triples.
4. In step 3, it is possible that some entities selected to be in-sample appear in no training triples. This can happen whenever an in-sample entity only appears in triples involving an out-of-sample entity. A similar situation can occur for some relations as well (i.e. some relations only appearing in the test set). Such entities and relations and the triples they appear in are removed from the dataset.
5. After doing the above steps, if the number of triples for an out-of-sample entity is less than 2, that entity is removed from the test set.
6. Randomly select half of the out-of-sample entities and the triples they appear in as validation set and the other half as test set.

Measures

To measure the performance of different models, for any out-of-sample entity v in the test set with triples $\mathcal{G}_v$, $|\mathcal{G}_v|$ queries are created where in the i-th query, the learned model is used to compute an embedding for v given all except the i-th triple in $\mathcal{G}_v$ and use that embedding to make a prediction about the i-th triple.

Figure 5A:
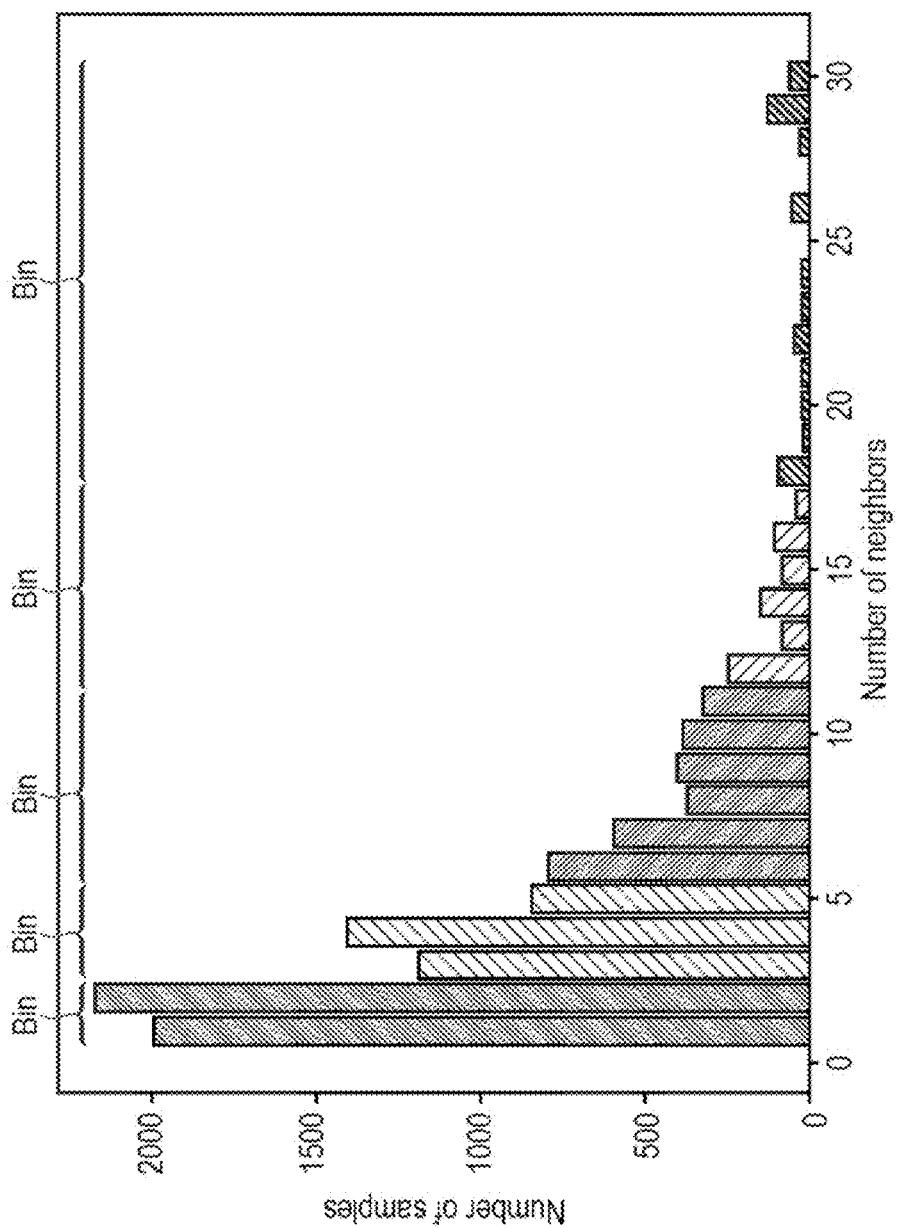
FIG. 5A and FIG. 5B are each graphs showing the number of test samples, in accordance with some embodiments.
Figure 5B:
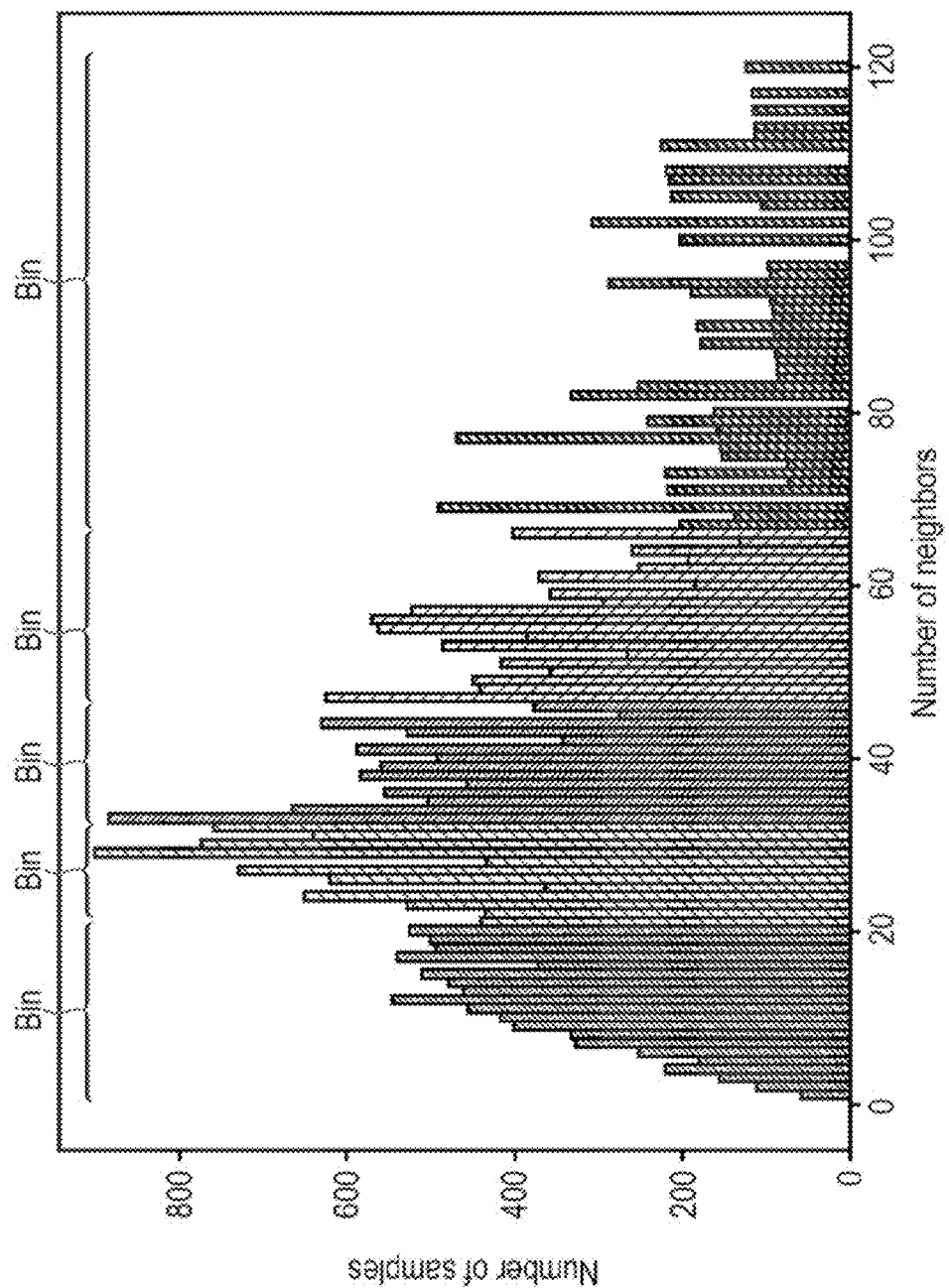

FIGS. 5A and 5B show statistics on the number of triples used to compute the embedding of the out-of-sample entities in the test set. If the i-th triple is of the form (v, r, u), then the query (v, r, ?) is created and the ranking the model assigns to u (the correct answer to the query) among entities $u' \in V$ such that $(v, r, u') \notin \mathcal{G}_v$ is found (the $(v, r, u') \notin \mathcal{G}_v$ constraint is known as the filtered setting). A similar procedure is followed for the case where the i-th triple is of the form (u, r, v). K (v, r, ?),u represents the rank of u for query (v, r, ?). Filtered mean reciprocal rank (MRR) computed as:

$$\frac{1}{\sum_{v \in Test} |\mathcal{G}_v|} \sum_{v \in Test} \left( \sum_{(v,r,u) \in \mathcal{G}_v} \frac{1}{K_{(v,r,?),u}} + \sum_{(v,r,u) \in \mathcal{G}_v} \frac{1}{K_{(v,r,?),u}} \right) \quad (5)$$

as well as filtered Hit@k (for $k \in \{1,3,10\}$) defined as:

$$\frac{1}{\sum_{v \in Test} |\mathcal{G}_v|} \sum_{v \in Test} \left( \sum_{(v,r,u) \in \mathcal{G}_v} \mathbb{1}_{K_{(v,r,?),u \leq k}} + \sum_{(u,r,v) \in \mathcal{G}_v} \mathbb{1}_{K_{(v,r,?),u \leq k}} \right) \quad (6)$$

where $\mathbb{1}_{condition}$ is 1 if the condition holds and 0 otherwise.

Continuing to refer to FIG. 5A and FIG. 5B, the number of test queries (on the y-axis) for which the embedding of the out-of-sample entity is computed based on k triples for oWN18RR (FIG. 5A) and oFB15k-237 (FIG. 5B) (e.g., for almost 2000 queries in OWN18RR, the embedding of the out-of-sample entity is learned based on only 1 triple). Since the number of samples for many of the larger values of k is 0, the x-axis is limited to k≤30 for oWN18RR and k≤120 for oFB15k-237. The bins used for the experiment in FIG. 5B and FIG. 5C are indicated.

Several baselines for out-of-sample representation learning over KGs were developed, as follows:

Popularity: In this baseline, in-sample entities are ranked based on the number of times they appear in the triples of the training set. Ties are broken randomly. At the test time, this ranking is used as the answer to all queries.

OOV: This baseline is inspired by the way a word embedding is computed for out-of-vocabulary (OOV) words (i.e. words unseen during training) in some works in the natural language processing literature. After training, the average embedding of all in-sample entities is computed and used as the embedding for out-of-sample entities.

RGCN-D: Graph convolutional networks (GCNs) have proved effective for inductive and out-of-sample learning when initial entity features are available. When such features are not available, Hamilton et al. (Will Hamilton, Zhitao Ying, and Jure Leskovec. 2017. Inductive representation learning on large graphs. In NeurIPS) proposed to use node degrees as initial entity features. Since KGs are multi-relational, entity features are initialized as vectors of size 2|$\mathcal{R}$| where the i-th and |$\mathcal{R}$|+i-th elements (for i<|$\mathcal{R}$|) represent the number of incoming and outgoing edges with relation type $r_i$ respectively. RGCN (Michael Schlichtkrull, Thomas N Kipf, Peter Bloem, Rianne Van Den Berg, Ivan Titov, and Max Welling. 2018. Modeling relational data with graph convolutional networks. In ESWC) is used as the GCN.

oDistMult-EAvg: Similar to the first baseline in Ma et al. (Jianxin Ma, Peng Cui, and Wenwu Zhu. 2018. DepthLGP: learning embeddings of out-of-sample nodes in dynamic networks. In AAAI), a simpler version of oDistMult-ERAvg is created by defining the embedding for an unobserved entity v as the average of the embeddings of the entities that are related to v. More formally, this baseline defines $$z_v = \text{aggregate}(v) = \frac{1}{|\mathcal{G}_v|}\left(\sum_{(v,r,u)\in\mathcal{G}_v} z_u + \sum_{(u,r,v)\in\mathcal{G}_v} z_u\right).$$

DistMult-EAvg, DistMult-ERAvg, DistMult-LS: These three baselines correspond to a variant of oDistMult-EAvg, oDistMult-ERAvg and oDistMult-LS where instead of using Algorithm 2 for training, the standard training in Algorithm 1 is used.

DistMult-LS-U: As an ablation study, an unnormalized version of DistMult-LS is included, where Equation (3) is changed to $z_v \cdot (z_r \odot z_u)=1$ (in other words, setting the elements of b in Equation (4) to 1).

For the RGCN-D baselines, the implementation in deep graph library (DGL) is used. Other models and baselines are implemented in PyTorch (Adam Paszke, Sam Gross, Soumith Chintala, Gregory Chanan, Edward Yang, Zachary DeVito, Zeming Lin, Alban Desmaison, Luca Antiga, and Adam Lerer. 2017. Automatic differentiation in pytorch. In NIPS-W). The AdaGrad optimizer (John Duchi, Elad Hazan, and Yoram Singer. 2011. Adaptive subgradient methods for online learning and stochastic optimization. JMLR) is used. The hyperparameters corresponding to learning rate and L2 regularization (2) via a grid search over {0.1,0.01} and {0.1,0.01,0.001,0.0001} respectively validating the models every 100 epochs are selected, and the best hyperparameters and epoch are selected based on validation filtered MRR. The negative ratio is set to 1 and embedding dimension to 200. When using Algorithm 2 for training, $\psi$ is set to 0.5 unless stated otherwise.

According to the results for the proposed baselines and models on OWN18RR and oFB15k-237 reported in Table 2 (FIG. 4B), in almost all cases, using Algorithm 2 for training as opposed to Algorithm 1 results in a boost of performance. On oWN18RR, for instance, oDistMult-ERAvg and oDistMult-LS achieve 28% and 16% improvement in terms of filtered MRR compared to DistMult-ERAvg and DistMult-LS respectively. The margins of improvements on oFB15k-237 are smaller as oFB15k-237 is generally a more challenging dataset compared to OWN18RR and is more difficult to make progress on.

Furthermore, it can be observed that the proposed oDistMult-ERAvg and oDistMult-LS models outperform the other baselines. The reason for the poor performance of RGCN-D on OWN18RR, for at least some cases, is because the out-of-sample entities have few neighbours (see FIG. 5A) and the degree information (used as initial features) is not discriminative enough. A variant of RGCN without self-loops was used (similar to the model in Takuo Hamaguchi, Hidekazu Oiwa, Masashi Shimbo, and Yuji Matsumoto. 2017. Knowledge transfer for out-of-knowledge-base entities: A graph neural network approach. arXiv preprint arXiv: 1706.05674) but similar results as RGCN-D were obtained. As shown, oDistMult-LS performs slightly better on OWN18RR and oDistMult-ERAvg has better performance on oFB15k-237. DistMult-LS also outperforms DistMult-LS-U based on the normalization in Equation (3).

Figure 6A:
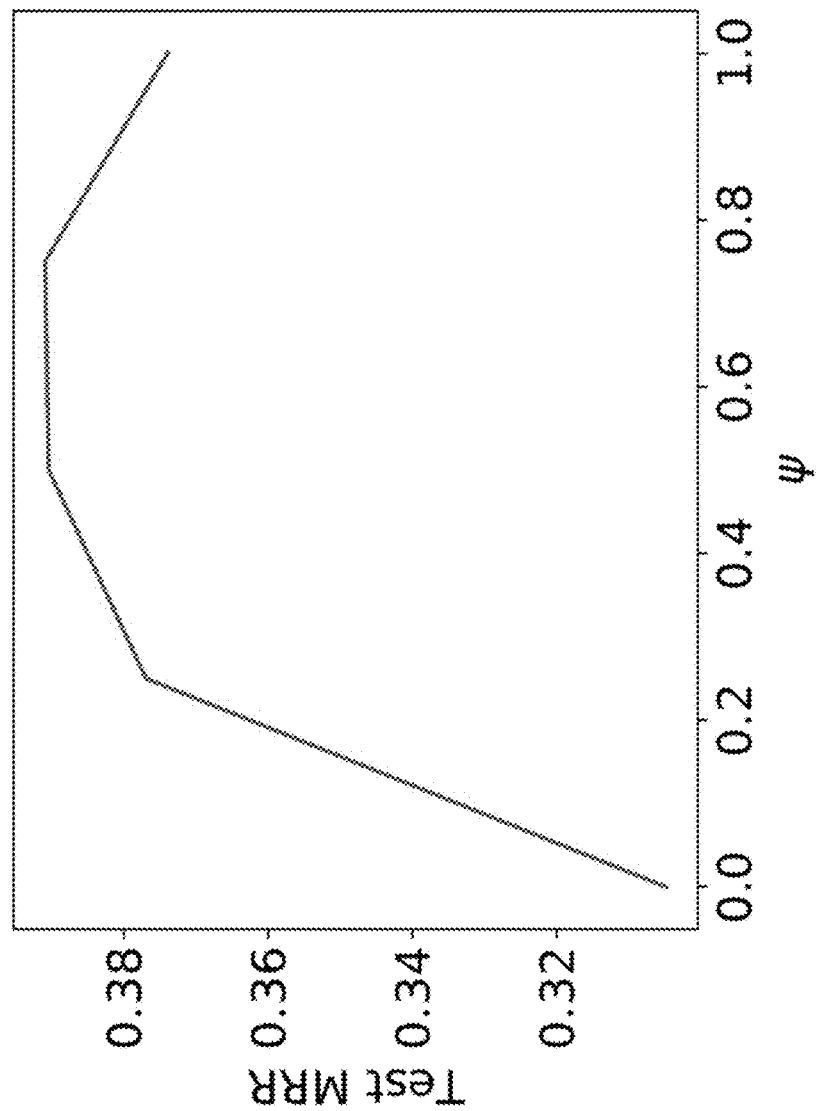
FIG. 6A, FIG. 6B, and FIG. 6C are each graphs of test MRR, in accordance with some embodiments.

Selecting $\psi$: For the results in Table 2 (FIG. 4B), the value of $\psi$ is set to 0.5 (see Algorithm 2 in FIG. 3B for the usage of $\psi$). FIG. 6A shows the test MRR of oDistMult-ERAvg on OWN18RR for different values of $\psi$. When $\psi=0$ (corresponding to using the standard transductive training algorithm presented in Algorithm 1), the performance is poor. As soon as $\psi$ becomes greater than zero, a substantial boost in performance is observed. The performance keeps increasing as $\psi$ increases until reaching a plateau and then it goes down when $\psi=1$ corresponding to a training procedure where for each triple, one entity is always treated as out-of-sample. The experiment is repeated with other models and on other datasets and observed a similar behaviour. A better performance for $0<\psi<1$ compared to $\psi=1$ is observed because, at least in some cases, when $0<\psi<1$, the model is encouraged to learn embeddings that do well for both transductive and out-of-sample prediction tasks with the transductive task acting as an auxiliary task (and possible as a regularizer) helping the embeddings capture more information.

Figure 6B:
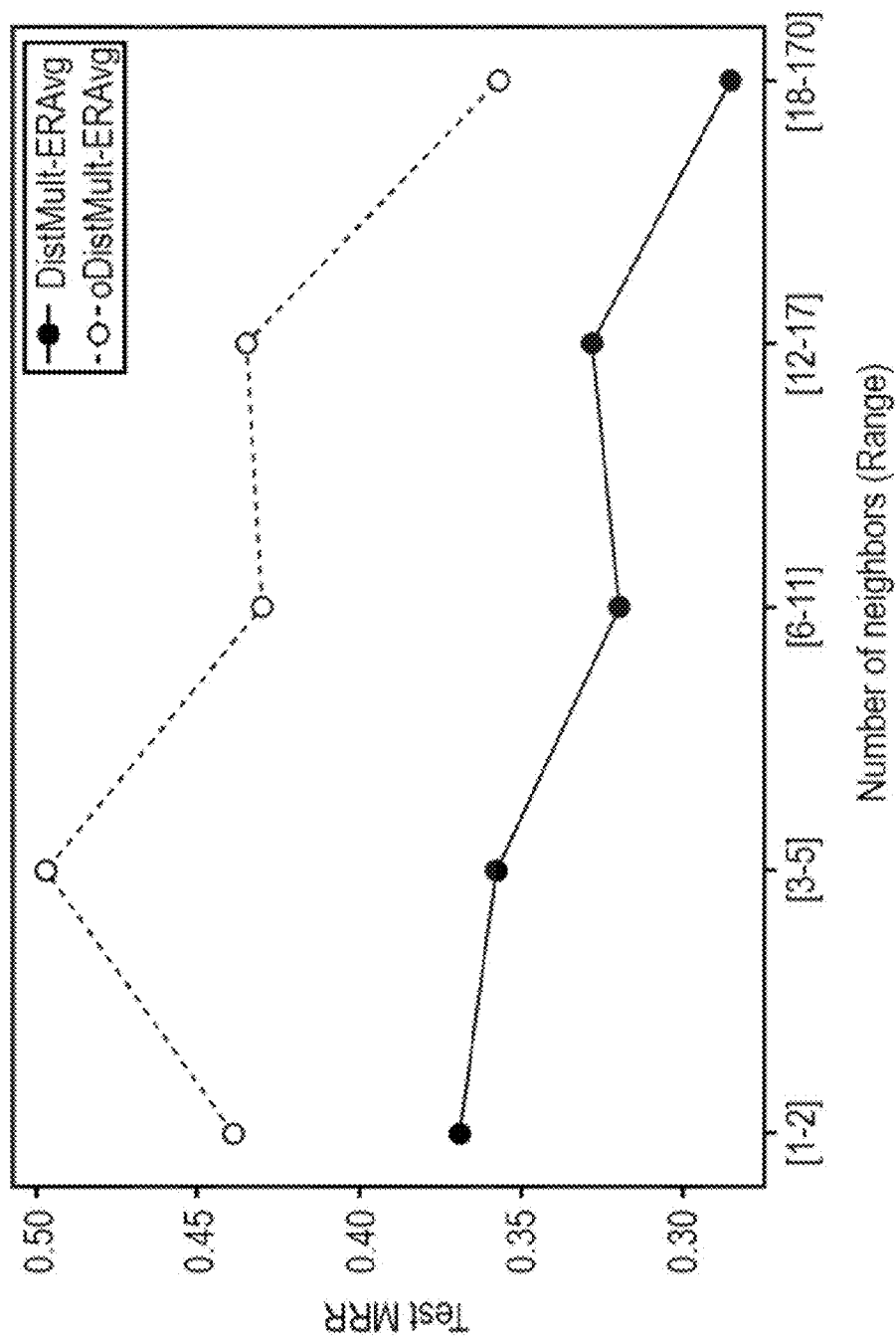
Figure 6C:
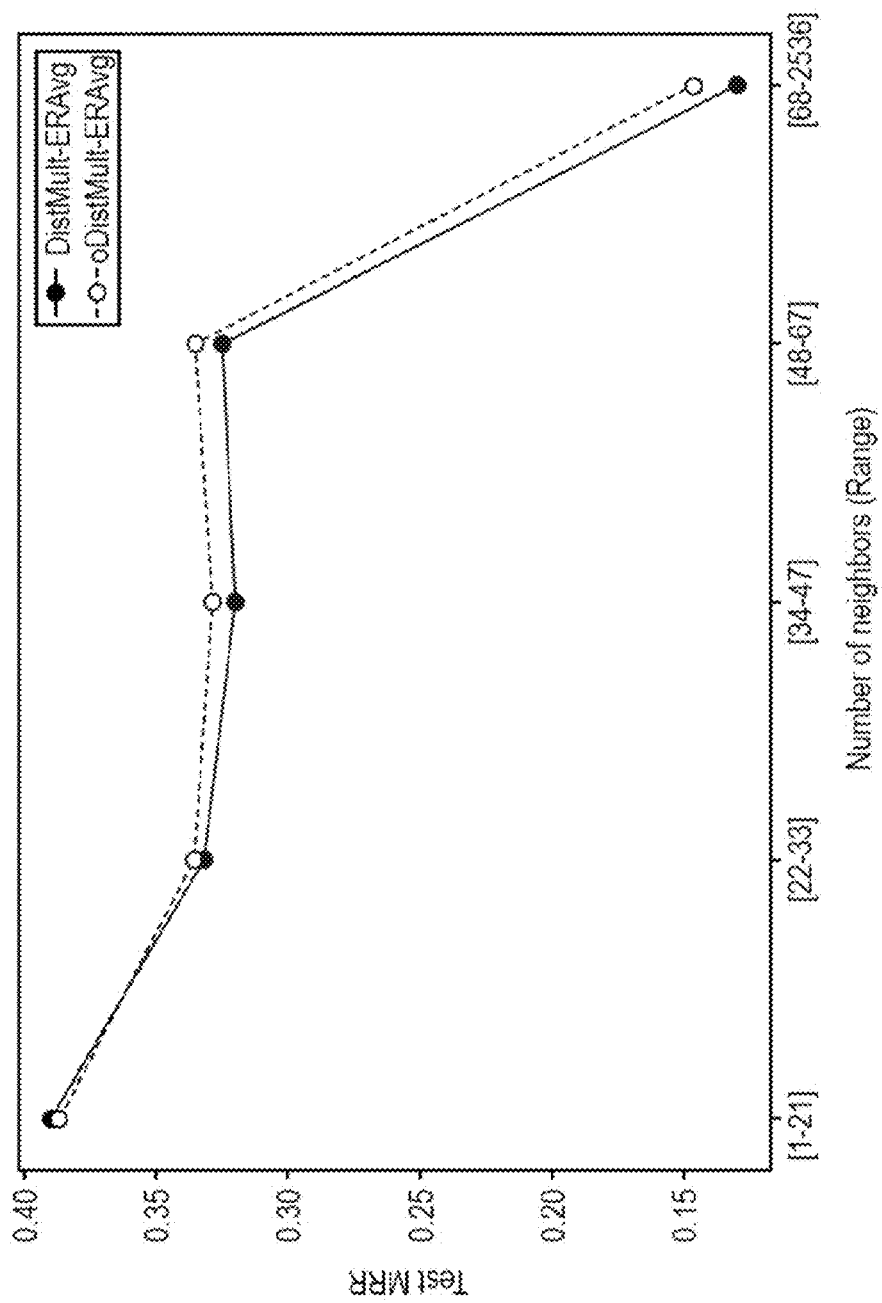

Neighbor-size effect: FIG. 6B and FIG. 6C show test MRR of DistMult-ERAvg and oDistMult-ERAvg on OWN18RR and oFB15k-237, respectively, for different bins (the bins are presented in FIG. 5A and FIG. 5B).

Out-of-sample entities appears in a different number of triples. FIG. 5A and FIG. 5B show statistics for oWN18RR and oFB15k-237 on the number of triples used to learn the embedding for the out-of-sample entity in each query in the test set. To test how this number affects the models, test queries were divided into 5 bins of (approximately) equal size as shown by the bar fill in FIG. 5A and FIG. 5B and the test MRR was measured on each bin. According to the results for oDistMult-ERAvg and DistMult-ERAvg, presented in FIG. 6B and FIG. 6C, oDistMult-ERAvg almost consistently outperforms DistMult-ERAvg on all (except one) bins. For both models, as the number of triples from the system learns the embedding for out-of-sample entities increase, the performance deteriorates, highlighting a shortcoming of the averaging strategy used for aggregation.

In-sample performance: FIG. 7 shows in-sample (aka transductive) link prediction results on a cleaned version of WN18RR named WN18AM (for details, see Ainaz Hajimoradlou and Seyed Mehran Kazemi. 2020. Stay positive: Knowledge graph embedding without negative sampling. In ICML Workshop on Graph Representation Learning and Beyond). Although oDistMult-ERAvg has been trained for out-of-sample reasoning, its performance on in-sample reasoning is almost as good as DistMult. This indicates that training with the proposed algorithm may not deteriorate the performance for in-sample link prediction.

To measure how training with Algorithm 2 affects model performance for in-sample link prediction, DistMult and oDistMult-ERAvg on the original splits of WN18AM, the cleaned version of WN18RR (Ainaz Hajimoradlou and Seyed Mehran Kazemi. 2020. Stay positive: Knowledge graph embedding without negative sampling. In ICML Workshop on Graph Representation Learning and Beyond), were compared. For this experiment, Adam optimizer (Diederik P Kingma and Jimmy Ba. 2014. Adam: A method for stochastic optimization. arXiv preprint arXiv: 1412.6980) was used and added a dropout of 0:5 after the Hadamard product of the embeddings (before taking the sum of the features) in DistMult. Learning rate and weight decay were both tuned from the set $\{0:0001; 0:001; 0:01; 0:1\}$.

Once trained in manners disclosed herein, learning system 100 may be used to make predictions on out-of-sample entities, e.g., using its trained embedding model.

Figure 8:
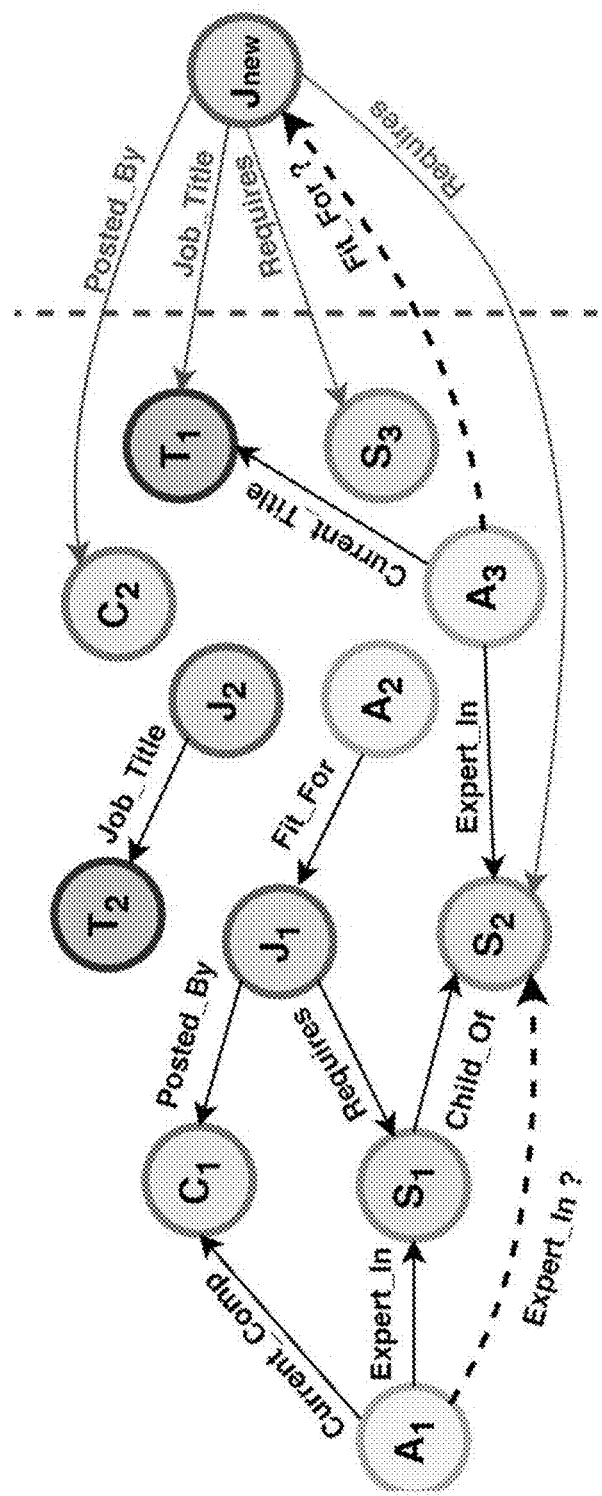
FIG. 8 is an example knowledge graph, in accordance with an embodiment.

FIG. 8 shows an example of a knowledge graph is presented on the left side of the dashed line where $A_i$s, $C_i$s, $S_i$s, $J_i$s and $T_i$s represent applicants, companies, skills, job postings, and titles respectively. Predicting whether A is expert in $S_2$ is an example of transductive reasoning. $J_{new}$ represents an out-of-sample entity which has not been observed during training. Predicting whether $A_3$ is a good fit for $J_{new}$ is an example of out-of-sample reasoning.

In an example application, learning system 100 is configured to predict whether $A_3$ is a good fit for the previously unseen job posting $J_{new}$ in FIG. 8 given the observed relationships of $J_{new}$ with other in-sample entities. This is in contrast to the transductive KG reasoning where at the test time, predictions are to be made only for in-sample entities (e.g., predicting if $A_1$ is expert in $S_2$ in FIG. 0). Out-of-sample reasoning is more challenging than transductive reasoning as it requires generalizing to unseen entities.

During operation, learning system 100 receives a data structure reflective of a knowledge graph embedding model. The model may be stored, for example, in electronic datastore 102. Learning system 100 also receives a training data set including a plurality of training data entries. Each of the training data entries includes data reflective of a head entity (e.g., v), a tail entity (e.g., u), and a relation therebetween (e.g., r), wherein at least one of the head entities or the tail entities includes an out-of-sample entity.

The training data entries are processed in batches. For a given training data entry reflective of a given head entity, a given tail entity, and a given relation, random number generator 110 generates a random number. System 100 selects from among a first way (with probability $\psi/2$), a second way (with probability $\psi/2$), an a third way (with probability $1-\psi$) of obtaining a head embedding for the given head entity and a tail embedding for the given tail entity, upon comparing the generated random number with at least one criterion.

Upon selecting the first way, and in accordance therewith, embedding retriever 116 retrieves, from the knowledge graph embedding model data structure, the tail embedding for the given tail entity, and embedding calculator 118 calculates the head embedding for the given head entity. Embedding retriever 116 also retrieves, from the knowledge graph embedding model data structure, a relation embedding for the given relation.

Scorer 106, upon processing the head embedding, the tail embedding, and the relation embedding, calculates a score reflective of a degree of belief that the given relation holds between the given head entity and the given tail entity.

For another given training data entry reflective of another given head entity, another given tail entity, and another given relation, random number generator 110 generates another random number.

System 100 selects from among a first way (with probability $\psi/2$), a second way (with probability $\psi/2$), and a third way (with probability $1-\psi$) of, obtaining a head embedding for the another given head entity and a tail embedding for the another given tail entity, upon comparing the generated random number with at least one criterion.

Upon selecting the second way, and in accordance therewith, embedding retriever 116 retrieves, from the knowledge graph embedding model data structure, the head embedding for the another given head entity; and embedding calculator 118 calculates the tail embedding for the another given tail entity. Embedding retriever 116 also retrieves, from the knowledge graph embedding model data structure, a relation embedding for the another given relation.

Scorer 106, upon processing the head embedding, the tail embedding, and the relation embedding, calculates a score reflective of a degree of belief that the another given relation holds between the another given head entity and the another given tail entity.

For yet another given training data entry reflective of yet another given head entity, yet another given tail entity, and yet another given relation, random number generator 110 generates yet another random number.

System 100 selects from among a first way (with probability $\psi/2$), a second way (with probability $\psi/2$, and a third way (with probability $1-\psi$) of obtaining a head embedding for the yet another given head entity and a tail embedding for the yet another given tail entity, upon comparing the generated random number with at least one criterion.

Upon selecting the third way, and in accordance therewith, embedding retriever 116 retrieves, from the knowledge graph embedding model data structure, the head embedding for the yet another given head entity; and embedding retriever 116 retrieves, from the knowledge graph embedding model data structure, the head embedding for the yet another given head entity. Embedding retriever 116 also retrieves, from the knowledge graph embedding model data structure, a relation embedding for the yet another given relation.

Scorer 106, upon processing the head embedding, the tail embedding, and the relation embedding, calculates a score reflective of a degree of belief that the yet another given relation holds between the yet another given head entity and the yet another given tail entity.

Loss calculator 112 calculates loss for the batch.

Embedding updater 108 updates the knowledge graph embedding model data structure based at least in part on the calculated scores and the calculated loss.

The operation of learning system 100 is further described with reference to the flowchart depicted in FIG. 9. System 100 performs the example operations depicted at blocks 900 and onward, in accordance with an embodiment.

Figure 9:
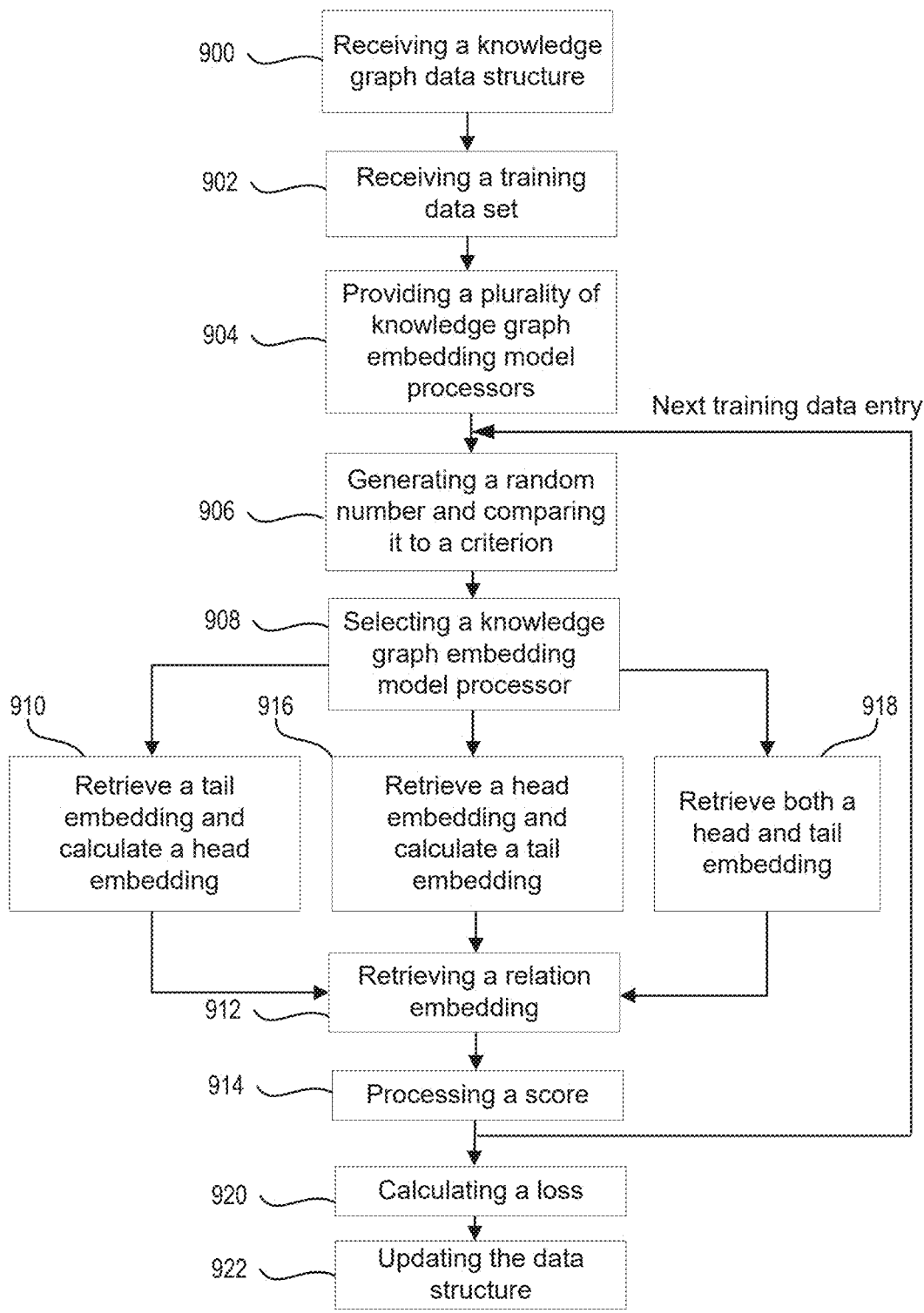
FIG. 9 is a flowchart of example operations of the learning system of FIG. 1, in accordance with an embodiment.

As shown in FIG. 9, at block 900, an embedding data structure reflective of a knowledge graph embedding model is received. At block 902, a training data set is received at block 902. The training data set includes a plurality of training data entries, each of the training data entries reflective of a head entity, a tail entity, and a relation therebetween, wherein at least one of the head entities or the tail entities includes an out-of-sample entity. At block 904, a plurality of knowledge graph embedding model processors 114 is provided.

For a given training data entry of the plurality of training data entries, the given training data entry reflective of a given head entity, a given tail entity, and a given relation, at block 906, a random number is generated and compared to at least one criterion. At block 908, a knowledge graph embedding model processor 114 is selected from among the plurality of knowledge graph embedding model processors 114 based at least in part on the comparison. When the selected knowledge graph embedding model processor 114 is knowledge graph embedding model processor 114a, at block 910, the embedding data structure is processed with knowledge graph embedding model processor 114a to retrieve, from the knowledge graph data structure, a tail embedding for the given tail entity. Also at block 910, knowledge graph embedding model processor 114a calculates a head embedding for the given head entity. At block 912, knowledge graph embedding model processor 114a retrieves, from the knowledge graph data structure, a relation embedding for the given relation. At block 914, upon processing the head embedding, the tail embedding, and the relation embedding, a score reflective of a degree of belief that the given relation holds between the given head entity and the given tail entity is calculated.

Processing from block 906 to blocks 914 may be repeated for another given training data entry.

In some embodiments, for another given training data entry of the plurality of training data entries, the another training data entry reflective of another given head entity, another given tail entity, and another given relation, at block 906, another random number is generated and compared to at least one criterion. At block 908, a knowledge graph embedding model processor 114 is selected from among the plurality of knowledge graph embedding model processors 114 based at least in part on the comparison. When the selected knowledge graph embedding model processor 114 is knowledge graph embedding model processor 114b, at block 916, the embedding data structure is processed with knowledge graph embedding model processor 114b to retrieve, from the knowledge graph data structure, a head embedding for the another given head entity. Also at block 916, the embedding data structure is processed with knowledge graph embedding model processor 114b to calculate a tail embedding for the another given tail entity. At block 912, knowledge graph embedding model processor 114b retrieves, from the knowledge graph data structure, a relation embedding for the another given relation. At block 914, upon processing the head embedding, the tail embedding, and the relation embedding, a score reflective of a degree of belief that the another given relation holds between the another given head entity and the another given tail entity is calculated.

Processing from block 906 to blocks 914 may be repeated for another given training data entry of the plurality of training data entries.

In some embodiments, for another given training data entry of the plurality of training data entries, the another training data entry reflective of another given head entity, another given tail entity, and another given relation, at block 906, another random number is generated and compared to the at least one criterion. At block 908, a knowledge graph embedding model processor 114 is selected from among the plurality of knowledge graph embedding model processors 114 based at least in part on the comparison. When the selected knowledge graph embedding model processor 114 is knowledge graph embedding model processor 114c, at block 918, the embedding data structure is processed with knowledge graph embedding model processor 114c to retrieve, from the knowledge graph data structure, a head embedding for the another given head entity and retrieve, from the knowledge graph embedding model data structure, a tail embedding for the another given tail entity. At block 912, knowledge graph embedding model processor 114c retrieves, from the knowledge graph data structure, a relation embedding for the another given relation. At block 914, upon processing the head embedding, the tail embedding, and the relation embedding, a score reflective of a degree of belief that the another given relation holds between the another given head entity and the another given tail entity is calculated.

In some embodiments, at block 920, a loss is calculated for a plurality of training data entries based on at least the scores computed at block 914.

In some embodiments, at block 922, the embedding data structure is updated based on the loss.

In some embodiments, blocks 906 to blocks 914 may be repeated for each training data entry of the training data set. In some embodiments, repeating comprises processing the training data entries in batches.

It should be understood that steps of one or more of the blocks depicted in FIG. 9 may be performed in a different sequence or in an interleaved or iterative manner. Further, variations of the steps, omission or substitution of various steps, or additional steps may be considered.

Figure 10:
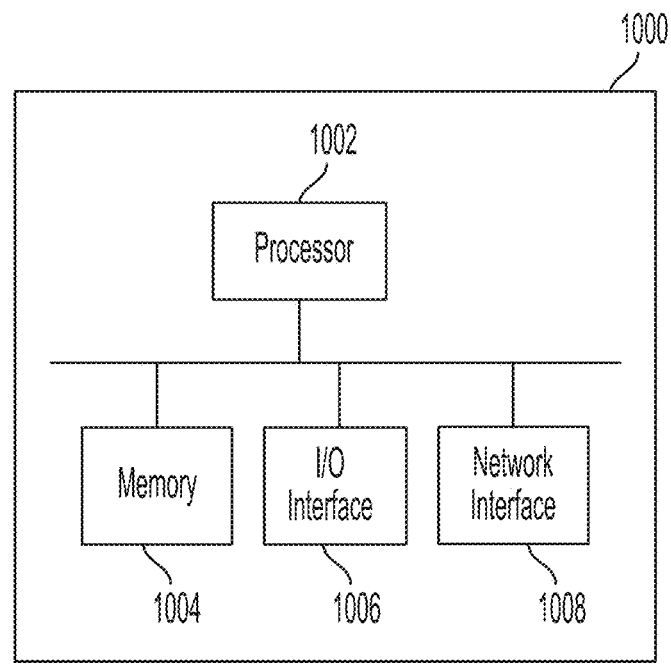
FIG. 10 is a schematic diagram of a computing device that implements the learning system FIG. 1, in accordance with an embodiment.

FIG. 10 is a schematic diagram of a computing device 1000 that implements learning system 100, in accordance with an embodiment. As depicted, computing device 1000 includes one or more processors 1002, memory 1004, one or more I/O interfaces 1006, and, optionally, one or more network interfaces 1008.

Each processor 1002 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 1004 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 1004 may store code executable at processor 1002, which causes learning system 100 to function in manners disclosed herein. Memory 1004 includes a data storage. In some embodiments, the data storage includes a secure datastore. In some embodiments, the data storage stores received data sets, such as textual data, image data, or other types of data.

Each I/O interface 1006 enables computing device 1000 to interconnect with one or more input devices, such as a keyboard, mouse, camera, touch screen and a microphone, or with one or more output devices such as a display screen and a speaker.

Each network interface 1008 enables computing device 1000 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The methods disclosed herein may be implemented using a system 100 that includes multiple computing devices 1000. The computing devices 1000 may be the same or different types of devices.

Each computing devices may be connected in various ways including directly coupled, indirectly coupled via a network, and distributed over a wide geographic area and connected via a network (which may be referred to as "cloud computing").

For example, and without limitation, each computing device 1000 may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods described herein.

In another aspect, some embodiments of the systems described herein are a computer-implemented system for out-of-sample representation learning using knowledge graphs. The system comprising at least one processor 1002, memory 1004 in communication with at least one processor 1002, and software code stored in memory 1004, which when executed by at least one processor 1002 causes the system to receive an embedding data structure reflective of a knowledge graph embedding model, receive a training data set including a plurality of training data entries, each of the training data entries reflective of a head entity, a tail entity, and a relation therebetween, wherein at least one of the head entities or the tail entities includes an out-of-sample entity, provide a plurality of knowledge graph embedding model processors 114. For a given training data entry of the plurality of training data entries, the given training data entry reflective of a given head entity, a given tail entity, and a given relation: generate a random number, using random number generator 110 and compare the random number to at least one criterion, select a first knowledge graph embedding model processor 114a from among plurality of knowledge graph embedding model processors 114 based at least in part on the comparison, process the embedding data structure with first knowledge graph embedding model processor 114a to retrieve, from the knowledge graph embedding model data structure, a tail embedding for the given tail entity using embedding retriever 116 and calculate a head embedding for the given head entity using embedding calculator 118, retrieve, from the knowledge graph embedding model data structure, a relation embedding for the given relation using embedding retriever 116, and upon processing the head embedding, the tail embedding, and the relation embedding, calculate a score reflective of a degree of belief that the given relation holds between the given head entity and the given tail entity using scorer 106.

In other embodiments, the software code stored in memory 1004, which when executed by at least one processor 1002 further causes the system to, for another given training data entry of the plurality of training data entries, the another training data entry reflective of another given head entity, another given tail entity, and another given relation: generate another random number, using random number generator 110, and compare the another random number to the at least one criterion, select a second knowledge graph embedding model processor 114b from among plurality of knowledge graph embedding model processors 114 based at least in part on the comparison, process the embedding data structure with second knowledge graph embedding model processor 114b to retrieve, from the knowledge graph embedding model data structure, a head embedding for the another given head entity using embedding retriever 116, and calculate a tail embedding for the another given tail entity using embedding calculator 118.

In some embodiments, the software code stored in memory 1004, which when executed by at least one processor 1002 further causes the system to, for another given training data entry of the plurality of training data entries, the another training data entry reflective of another given head entity, another given tail entity, and another given relation: generate another random number using random number generator 110, and compare the another random number to the at least one criterion, select a third knowledge graph embedding model processor 114c from among plurality of knowledge graph embedding model processors 114 based at least in part on the comparison, process the embedding data structure with third knowledge graph embedding model processor 114c to retrieve, from the knowledge graph embedding model data structure, a head embedding for the another given head entity and a tail embedding for the another given tail entity using embedding retriever 102.

Representation learning has proved effective for reasoning in KGs (Maximilian Nickel, Kevin Murphy, Volker Tresp, and Evgeniy Gabrilovich. 2016. A review of relational machine learning for knowledge graphs. *Proceedings of the IEEE,* 104 (1): 11-33; William L Hamilton, Rex Ying, and Jure Leskovec. 2017. Representation learning on graphs: Methods and applications. *IEEE Data Engineering Bulletin,* 40 (3): 52-74; Seyed Mehran Kazemi, Rishab Goel, Kshitij Jain, Ivan Kobyzev, Akshay Sethi, Peter Forsyth, and Pascal Poupart. 2020. Representation learning for dynamic graphs: A survey. *Journal of Machine Learning Research,* 21 (70): 1-73). It has been extensively studied for transductive reasoning in attributed graphs (where each entity has an initial feature vector) and non-attributed KGs (where the only initial information derives from known relations with other entities) as well as simple graphs (in which there is only a single relation). A prominent class of such models for both KGs and simple graphs are based on extensions of the convolution operator to non-Euclidean domains (Thomas N. Kipf and Max Welling. 2017. Semisupervised classification with graph convolutional networks. In ICLR; Michaël Defferrard, Xavier Bresson, and Pierre Vandergheynst. 2016. Convolutional neural networks on graphs with fast localized spectral filtering. In NeurIPS, pages 3844-3852; David K Hammond, Pierre Vandergheynst, and Rémi Gribonval. 2011. Wavelets on graphs via spectral graph theory. *Applied and Computational Harmonic Analysis,* 30 (2): 129-150; Michael Schlichtkrull, Thomas N Kipf, Peter Bloem, Rianne Van Den Berg, Ivan Titov, and Max Welling. 2018. Modeling relational data with graph convolutional networks. In ESWC). Other prominent classes for KGs include translational approaches which model relations as translations (or rotations) from subject to object entities (Antoine Bordes, Nicolas Usunier, Alberto Garcia-Duran, Jason Weston, and Oksana Yakhnenko. 2013. Translating embeddings for modeling multirelational data. In NeurIPS, pages 2787-2795; Guoliang Ji, Shizhu He, Liheng Xu, Kang Liu, and Jun Zhao. 2015. Knowledge graph embedding via dynamic mapping matrix. In ACL (1), pages 687-696; Dat Quoc Nguyen, Kairit Sirts, Lizhen Qu, and Mark Johnson. 2016. Stranse: a novel embedding model of entities and relationships in knowledge bases. In NAACL-HLT; Zhiqing Sun, Zhi-Hong Deng, Jian-Yun Nie, and Jian Tang. 2019. RotatE: Knowledge graph embedding by relational rotation in complex space. In ICLR) and tensor factorization approaches where a KG is represented as a 3rd order tensor and then factorized to produce entity and relation embeddings (Bishan Yang, Wen-tau Yih, Xiaodong He, Jianfeng Gao, and Li Deng. 2015. Embedding entities and relations for learning and inference in knowledge bases. ICLR; Théo Trouillon, Johannes Welbl, Sebastian Riedel, Éric Gaussier, and Guillaume Bouchard. 2016. Complex embeddings for simple link prediction. In ICML, pages 2071-2080; Seyed Mehran Kazemi and David Poole. 2018. SimplE embedding for link prediction in knowledge graphs. In NeurIPS, pages 4289-4300; Shuai Zhang, Yi Tay, Lina Yao, and Qi Liu. 2019. Quaternion knowledge graph embedding. In NeurIPS).

Out-of-sample representation learning has also been extensively studied for attributed KGs (Ruobing Xie, Zhiyuan Liu, Jia Jia, Huanbo Luan, and Maosong Sun. 2016. Representation learning of knowledge graphs with entity descriptions. In AAAI; Yu Zhao, Sheng Gao, Patrick Gallinari, and Jun Guo. 2017. Zero-shot embedding for unseen entities in knowledge graph. *IEICE Transactions on Information and Systems*, 100 (7): 1440-1447) and attributed simple graphs (Zhilin Yang, William W Cohen, and Ruslan Salakhutdinov. 2016. Revisiting semisupervised learning with graph embeddings. In ICML; Will Hamilton, Zhitao Ying, and Jure Leskovec. 2017. Inductive representation learning on large graphs. In NeurIPS; Petar Veličković, Guillem Cucurull, Arantxa Casanova, Adriana Romero, Pietro Lio, and Yoshua Bengio. 2018. Graph attention networks. In ICLR; Jie Chen, Tengfei Ma, and Cao Xiao. 2018. Fastgcn: fast learning with graph convolutional networks via importance sampling. In ICLR). For non-attributed KGs, however, advancements are required. The main challenge for out-of-sample representation learning over non-attributed KGs is that an entity representation should be learned only using the relationships the entity participates in. Ma et al. (Jianxin Ma, Peng Cui, and Wenwu Zhu. 2018. DepthLGP: learning embeddings of out-of-sample nodes in dynamic networks. In AAAI) developed such a model for non-attributed simple graphs but extending their work to KGs (which, as opposed to simple graphs, are multi-relational) is not straightforward.

Note that while transductive models can be used for out-of-sample reasoning through additional rounds of gradient descent at the test time, the computational costs associated with such an approach prohibit the use of these models for high-throughput production systems. Reduction in computational costs may be achieved using embodiments of the new systems and methods for learning representations for out-of-sample entities, as detailed herein.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references are made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The foregoing discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The embodiments and examples described herein are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A computer-implemented method for out-of-sample representation learning using non-attributed knowledge graphs to make predictions about out-of-sample entities at inference time, said method comprising:
   receiving an embedding data structure reflective of a non-attributed knowledge graph embedding model;
   receiving a training data set including a plurality of training data entries, each of said training data entries reflective of a head entity, a tail entity, and a relation therebetween, wherein at least one of said head entities or said tail entities includes an out-of-sample entity;
   providing a plurality of knowledge graph embedding model processors;
   for a given training data entry of said plurality of training data entries, said given training data entry reflective of a given head entity, a given tail entity, and a given relation:
   with stochastic frequency $\psi/2$, selecting a first knowledge graph embedding model processor from among the plurality of knowledge graph embedding model processors to process the knowledge graph embedding model data structure, wherein the first knowledge graph embedding model processor is configured to:
   retrieve, from said knowledge graph embedding model data structure, a tail embedding for said given tail entity; and
   generate a head embedding for said given head entity using an aggregation function with no learnable parameters, wherein the aggregation function provides the head embedding at inference time for said given head entity based on embeddings from said knowledge graph embedding model data structure;
   with stochastic frequency $\psi/2$, selecting a second knowledge graph embedding model processor from among the plurality of knowledge graph embedding model processors to process the knowledge graph embedding model data structure, wherein the second knowledge graph embedding model processor is configured to:
   retrieve, from said knowledge graph embedding model data structure, the head embedding for said given head entity; and
   generate the tail embedding for said given tail entity using the aggregation function with no learnable parameters, wherein the aggregation function provides the tail embedding at inference time for said given tail entity based on embeddings from said knowledge graph embedding model data structure,
   wherein $\psi$ encourages learning embeddings for predictions of out-of-sample entities; and
   retrieving, from said knowledge graph embedding model data structure, a relation embedding for said given relation; and
   upon processing said head embedding, said tail embedding, and said relation embedding, generating a score reflective of a degree of belief that said given relation holds between said given head entity and said given tail entity.

2. The computer-implemented method of claim 1, wherein the plurality of knowledge graph embedding model processors includes at least three knowledge graph embedding model processors.

3. The computer-implemented method of claim 2, further comprising:
   with stochastic frequency $1-\psi$, selecting a third knowledge graph embedding model processor from among the plurality of knowledge graph embedding model processors to process the knowledge graph embedding model data structure, wherein the third knowledge graph embedding model processor is configured to:
   retrieve, from said knowledge graph embedding model data structure, the head embedding for said given head entity and the tail embedding for said given tail entity.

4. The computer-implemented method of claim 1, further comprising generating a loss according to said score.

5. The computer-implemented method of claim 4, further comprising updating said knowledge graph embedding model data structure based on said loss.

6. The computer-implemented method of claim 5, wherein said updating includes computing a loss gradient.

7. The computer-implemented method of claim 5, wherein said updating includes applying gradient descent.

8. The computer-implemented method of claim 1, further comprising: repeating said generating for a plurality of data training data entries of said training data set.

9. The computer-implemented method of claim 8, wherein said repeating comprises processing said data training data entries in batches.

10. The computer-implemented method of claim 1, wherein said aggregation function provides an average of the embeddings from said knowledge graph embedding model data structure.

11. The computer-implemented method of claim 1, wherein said aggregation function provides a solution to a least squares problem to maximize said score using said head embedding, said tail embedding, and said relation embedding.

12. A computer-implemented system for out-of-sample representation learning using non-attributed knowledge graphs to make predictions about out-of-sample entities at inference time, said system comprising:
- at least one processor;
- memory in communication with said at least one processor, and
- software code stored in said memory, which when executed by said at least one processor causes said system to:
- receive an embedding data structure reflective of a non-attributed knowledge graph embedding model;
- receive a training data set including a plurality of training data entries, each of said training data entries reflective of a head entity, a tail entity, and a relation therebetween, wherein at least one of said head entities or said tail entities includes an out-of-sample entity;
- provide a plurality of knowledge graph embedding model processors;
- for a given training data entry of said plurality of training data entries, said given training data entry reflective of a given head entity, a given tail entity, and a given relation:
  - with stochastic frequency $\psi/2$, select a first knowledge graph embedding model processor from among the plurality of knowledge graph embedding model processors to process the knowledge graph embedding model data structure, wherein the first knowledge graph embedding model processor is configured to:
    - retrieve, from said knowledge graph embedding model data structure, a tail embedding for said given tail entity; and
    - generate a head embedding for said given head entity using an aggregation function with no learnable parameters, wherein the aggregation function provides the head embedding at inference time for said given head entity based on embeddings from said knowledge graph embedding model data structure;
  - with stochastic frequency $\psi/2$, select a second knowledge graph embedding model processor from among the plurality of knowledge graph embedding model processors to process the knowledge graph embedding model data structure, wherein the second knowledge graph embedding model processor is configured to:
    - retrieve, from said knowledge graph embedding model data structure, the head embedding for said given head entity; and
    - generate the tail embedding for said given tail entity using the aggregation function with no learnable parameters, wherein the aggregation function provides the tail embedding at inference time for said given tail entity based on embeddings from said knowledge graph embedding model data structure,
  - wherein $\psi$ encourages learning embeddings for predictions of out-of-sample entities; and
  - retrieve, from said knowledge graph embedding model data structure, a relation embedding for said given relation; and
  - upon processing said head embedding, said tail embedding, and said relation embedding, generate a score reflective of a degree of belief that said given relation holds between said given head entity and said given tail entity.

13. The computer-implemented system of claim 12, wherein the plurality of knowledge graph embedding model processors includes at least three knowledge graph embedding model processors.

14. The computer-implemented system of claim 13, wherein said software code stored in said memory, when executed by said at least one processor further causes said system to:
- with stochastic frequency $1-\psi$, select a third knowledge graph embedding model processor from among the plurality of knowledge graph embedding model processors to process the knowledge graph embedding model data structure, wherein the third knowledge graph embedding model processor is configured to:
  - retrieve, from said knowledge graph embedding model data structure, the head embedding for said given head entity and the tail embedding for said given tail entity.

15. The computer-implemented system of claim 12, wherein said software code stored in said memory, when executed by said at least one processor further causes said system to:
- calculate a loss according to said score.

16. The computer-implemented system of claim 15, wherein said software code stored in said memory, when executed by said at least one processor further causes said system to:
- update said knowledge graph embedding model data structure based on said loss.

17. The computer-implemented system of claim 12, wherein said aggregation function provides an average of the embeddings from said knowledge graph embedding model data structure.

18. The computer-implemented system of claim 12, wherein said aggregation function provides a solution to a least squares problem to maximize said score using said head embedding, said tail embedding, and said relation embedding.

19. A non-transitory computer-readable medium having stored thereon machine interpretable instructions which, when executed by a processor, cause the processor to perform a computer implemented method for out-of-sample representation learning using non-attributed knowledge graphs to make predictions about out-of-sample entities at inference time, said method comprising:
- receiving an embedding data structure reflective of a non-attributed knowledge graph embedding model;
- receiving a training data set including a plurality of training data entries, each of said training data entries reflective of a head entity, a tail entity, and a relation therebetween, wherein at least one of said head entities or said tail entities includes an out-of-sample entity;
- providing a plurality of knowledge graph embedding model processors;
- for a given training data entry of said plurality of training data entries, said given training data entry reflective of a given head entity, a given tail entity, and a given relation:
  - with stochastic frequency $\psi/2$, selecting a first knowledge graph embedding model processor from among the plurality of knowledge graph embedding model processors to process the knowledge graph embedding model data structure, wherein the first knowledge graph embedding model processor is configured to:
    - retrieve, from said knowledge graph embedding model data structure, a tail embedding for said given tail entity; and
    - generate a head embedding for said given head entity using an aggregation function with no learnable parameters, wherein the aggregation function provides the head embedding at inference time for said given head entity based on embeddings from said knowledge graph embedding model data structure;

with stochastic frequency $\psi/2$, selecting a second knowledge graph embedding model processor from among the plurality of knowledge graph embedding model processors to process the knowledge graph embedding model data structure, wherein the second knowledge graph embedding model processor is configured to:

retrieve, from said knowledge graph embedding model data structure, the head embedding for said given head entity; and generate the tail embedding for said given tail entity using the aggregation function with no learnable parameters, wherein the aggregation function provides the tail embedding at inference time for said given tail entity based on embeddings from said knowledge graph embedding model data structure, wherein $\psi$ encourages learning embeddings for predictions of out-of-sample entities; and retrieving, from said knowledge graph embedding model data structure, a relation embedding for said given relation; and upon processing said head embedding, said tail embedding, and said relation embedding, generating a score reflective of a degree of belief that said given relation holds between said given head entity and said given tail entity.

\* \* \* \* \*